US012583162B2

(12) United States Patent
Nozawa

(10) Patent No.: US 12,583,162 B2
(45) Date of Patent: Mar. 24, 2026

(54) INSPECTION APPARATUS, INJECTION MOLDING SYSTEM, AND INSPECTION METHOD

(71) Applicant: SUMITOMO HEAVY INDUSTRIES, LTD., Tokyo (JP)

(72) Inventor: Itta Nozawa, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 316 days.

(21) Appl. No.: 18/192,585

(22) Filed: Mar. 29, 2023

(65) Prior Publication Data

US 2023/0311390 A1 Oct. 5, 2023

(30) Foreign Application Priority Data

Mar. 30, 2022 (JP) ................................. 2022-056149

(51) Int. Cl.
B29C 45/76 (2006.01)
G01N 21/88 (2006.01)
G06T 7/00 (2017.01)

(52) U.S. Cl.
CPC ....... B29C 45/768 (2013.01); G01N 21/8806 (2013.01); G06T 7/001 (2013.01); B29C 2945/7629 (2013.01); B29C 2945/76464 (2013.01); B29C 2945/76936 (2013.01); B29C 2945/76949 (2013.01); B29C 2945/76979 (2013.01); G01N 2021/8848 (2013.01)

(58) Field of Classification Search
CPC .. B29C 2945/7629; B29C 2945/76464; B29C 2945/76979; B29C 45/768; G01N 2021/8848; G06T 7/001
See application file for complete search history.

(56) References Cited

U.S. PATENT DOCUMENTS

| 2015/0069247 A1* | 3/2015 | Asundi | ................... | G01N 21/23 |
| | | | | 250/341.3 |
| 2021/0264147 A1 | 8/2021 | Kadambi et al. | | |
| 2022/0048237 A1* | 2/2022 | Laico | ..................... | B29C 49/80 |
| 2022/0157070 A1 | 5/2022 | Kadambi et al. | | |

(Continued)

FOREIGN PATENT DOCUMENTS

| CN | 113711019 A | 11/2021 |
| JP | S64-072822 A | 3/1989 |

(Continued)

OTHER PUBLICATIONS

Office Action of the corresponding CN Application No. 202310080747.1 Mailed on Oct. 16, 2025.

*Primary Examiner* — John J DeRusso
(74) *Attorney, Agent, or Firm* — WTA IP Law P.C.

(57) ABSTRACT

An inspection apparatus includes an imaging device acquiring a polarization image of a molding product, and a determination unit determining quality of the molding product. The determination unit includes an image generating unit generating a pseudo image from an input image in accordance with a machine-learned learning model, and the determination unit inputs the polarization image or a calculation image obtained by calculation from the polarization image to the image generating unit as the input image and determines the quality of the molding product based on the input image and the pseudo image generated by the image generating unit.

12 Claims, 15 Drawing Sheets

(56)     References Cited

U.S. PATENT DOCUMENTS

2023/0120081 A1* 4/2023 Laico .................... B29C 45/768
                                                    356/240.1
2025/0164407 A1* 5/2025 Harada .............. G02B 21/0092

FOREIGN PATENT DOCUMENTS

| JP | H1-120317 | 5/1989 |
| JP | 2020-190514 A | 11/2020 |
| JP | 2021-058272 A | 4/2021 |
| WO | WO2021/055585 A1 | 3/2021 |

* cited by examiner

110

114

3

113

112

111

| POLARIZATION ANGLE = 0° | POLARIZATION ANGLE = 45° | POLARIZATION ANGLE = 90° | POLARIZATION ANGLE = 135° |

110

315

ROTATING
MEANS

3

112

111

INSPECTION APPARATUS, INJECTION MOLDING SYSTEM, AND INSPECTION METHOD

CROSS-REFERENCE TO RELATED APPLICATIONS

This application claims priority to Japanese Patent Application No. 2022-056149, filed on Mar. 30, 2022, which is incorporated by reference herein in its entirety.

BACKGROUND

Technical Field

Certain embodiments of the present invention relate to an inspection apparatus, an injection molding system, and an inspection method.

Description of Related Art

The related art discloses a system including a light source irradiating an injection molding product via a polarizing plate, imaging means for imaging the injection molding product via a polarizing plate, and setting value correction means for correcting a setting value of a molding process based on a polarization stripe pattern obtained by the imaging means.

SUMMARY

An inspection apparatus according to an embodiment of the present invention includes an imaging device acquiring a polarization image of a molding product, and a determination unit determining quality of the molding product. The determination unit includes an image generating unit generating a pseudo image from an input image in accordance with a machine-learned learning model, and the determination unit inputs the polarization image or a calculation image obtained by calculation from the polarization image to the image generating unit as the input image and determines the quality of the molding product based on the input image and the pseudo image generated by the image generating unit.

An injection molding system according to an embodiment of the present invention includes an injection molding machine and the inspection apparatus inspecting a molding product molded by the injection molding machine.

An inspection method according to an embodiment of the present invention includes acquiring a polarization image of a molding product with an imaging device, inputting the polarization image or a calculation image obtained by calculation from the polarization image to an image generating unit as an input image, and determining quality of the molding product based on a pseudo image of the input image generated by the image generating unit and on the input image.

DETAILED DESCRIPTION

It is preferable to be capable of determining the quality of an injection molding product with small load. According to an embodiment of the present invention, there are provided an inspection apparatus, an injection molding system, and an inspection method enabling small-load molding product quality determination.

Hereinafter, embodiments of the present invention will be described in detail with reference to the accompanying drawings.

Figure 1:
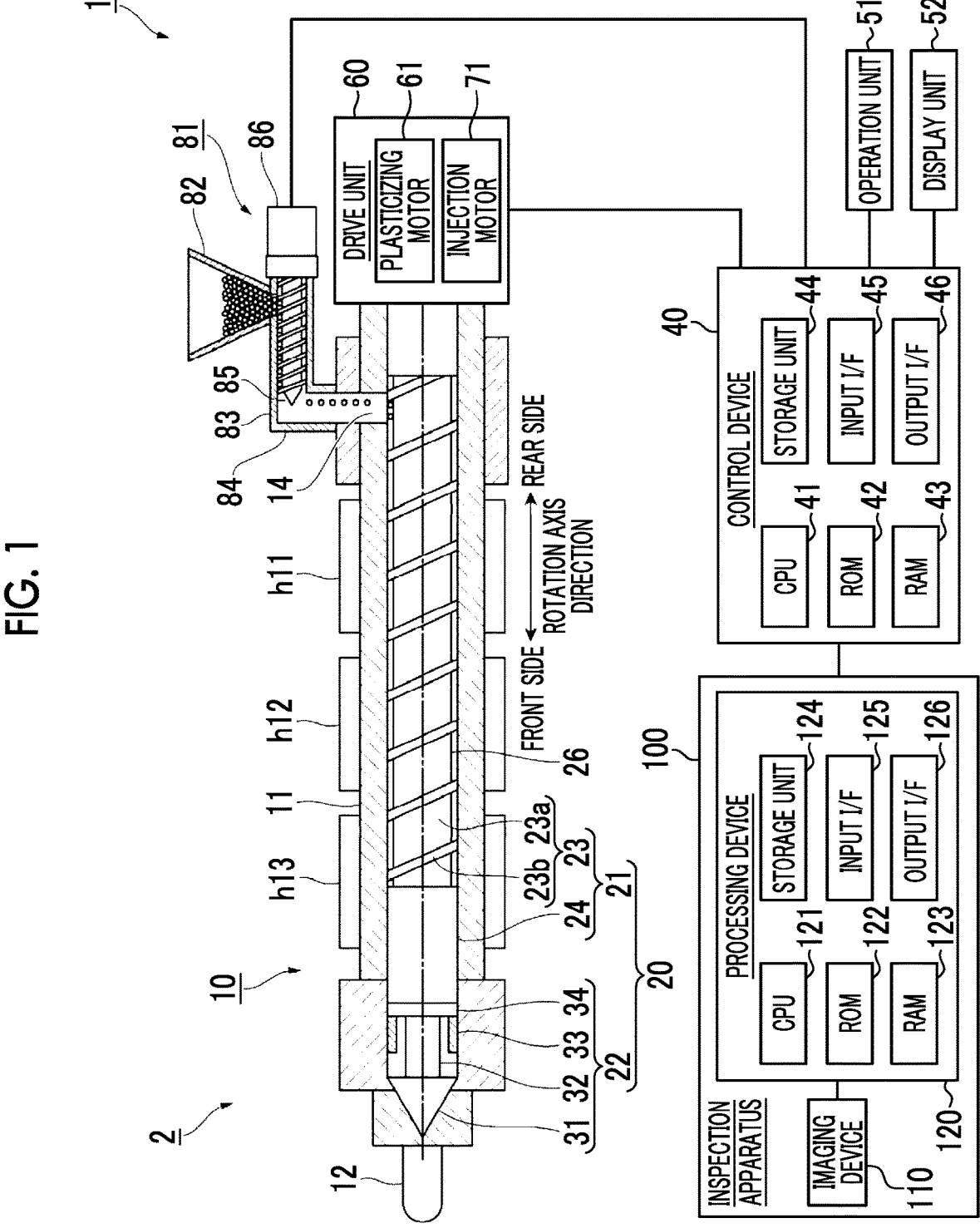
FIG. 1 is a diagram illustrating an example of a schematic configuration of an injection molding system according to an embodiment.
Figure 2:
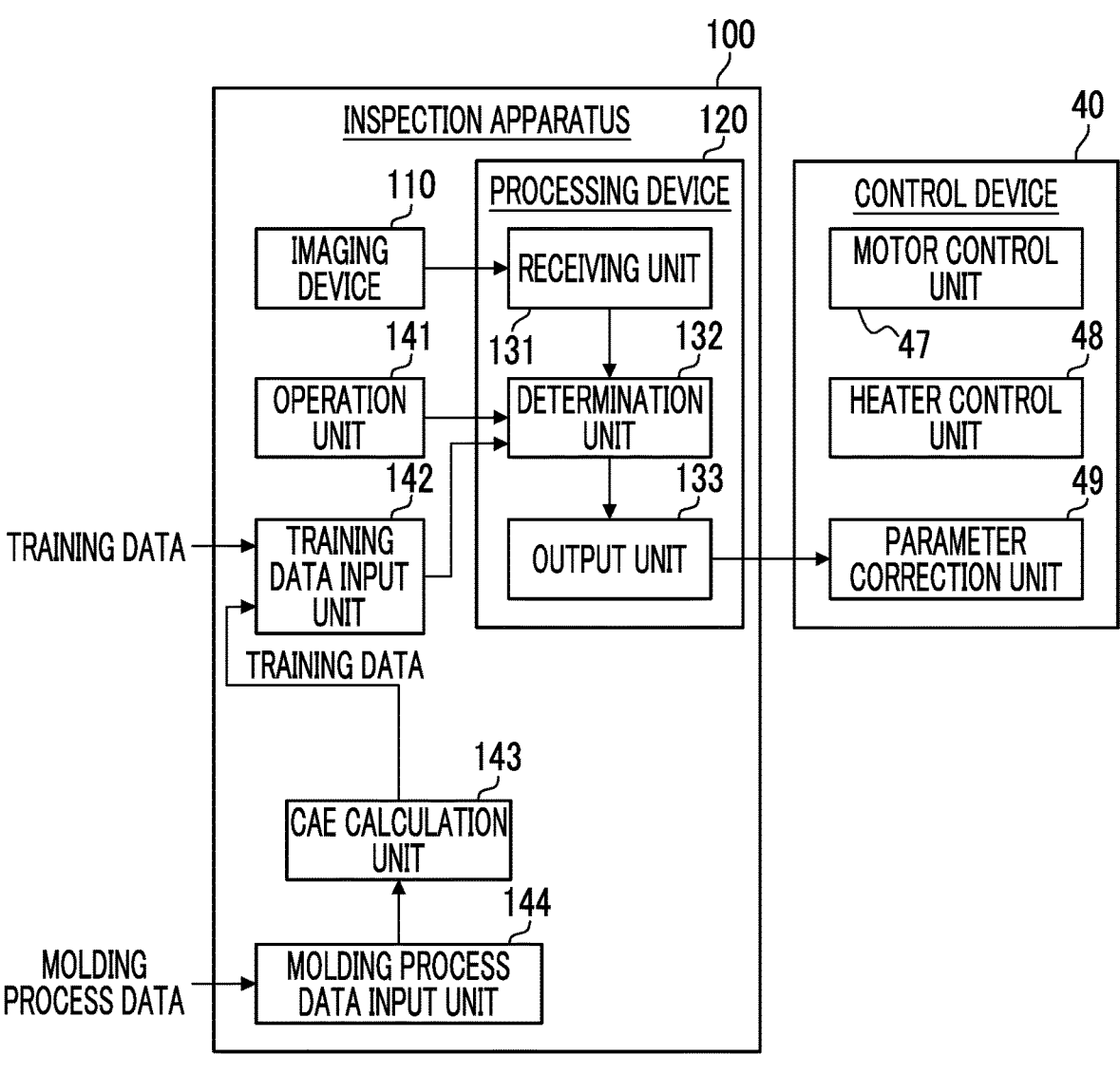
FIG. 2 is an example of a block diagram illustrating functions of a control device and of a processing device.

FIG. 1 is a diagram illustrating an example of a schematic configuration of an injection molding system 1 according to a first embodiment. FIG. 2 is an example of a block diagram illustrating functions of a control device 40 and of a processing device 120.

The injection molding system 1 includes an injection molding machine 2 and an inspection apparatus 100 inspecting the quality of a molding product molded by the injection molding machine 2 (including whether the product is normal or abnormal).

Injection Molding Machine 2

First, the injection molding machine 2 will be described. In the following description, a direction of resin injection is defined as a front side, and a direction opposite to the resin injection direction is defined as a rear side.

The injection molding machine 2 includes a mold clamping unit (not illustrated), an injection unit 10, a material supply device 81, a control device 40 controlling the entire apparatus, an operation unit 51 receiving an input operation from a user, and a display unit 52 displaying an operation reception screen or an image.

The mold clamping unit, the injection unit 10, the material supply device 81, and the control device 40 will be described in detail later.

The operation unit 51 can be exemplified by an input device such as a button, a switch, and a touch panel. The display unit 52 can be exemplified by a liquid crystal display or an organic EL display. The operation unit 51 and the display unit 52 may be configured integrally.

The injection molding machine 2 has a mold closing process, a mold clamping process, a filling process, a holding pressure process, a cooling process, a plasticizing process, a mold opening process, and an ejection process as one cycle and repeatedly manufactures the molding product. The mold closing process is a process of closing a mold unit configured by a stationary mold and a movable mold. The mold clamping process is a process of clamping the mold unit. The filling process is a process of pouring a molten resin into the mold unit. The holding pressure process is a process of applying pressure to the poured resin. The cooling process is a process of solidifying the resin in the mold unit after the holding pressure process. The plasticizing process is a process of plasticizing the molten resin for the next molding product. The mold opening process is a process of opening the mold unit. The ejection process is a process of ejecting the molding product from the mold unit after the mold opening. It should be noted that the plasticizing process may be performed during the cooling process so that the molding cycle is shortened.

Mold Clamping Unit

The mold clamping unit, which includes a stationary platen to which a stationary mold is attached and a movable platen to which a movable mold is attached, performs mold closing, mold clamping, and mold opening by causing the movable platen to advance and retreat and causing the movable mold to come into contact with or be separated from the stationary mold. The mold clamping unit is not particularly limited in terms of type. Examples thereof include a toggle type using an electric motor and a toggle mechanism, a direct pressure type using a fluid pressure cylinder, and an electromagnetic type using a linear motor and an electromagnet.

Injection Unit 10

The injection unit 10 has a cylinder 11 for heating a resin as a molding material and a nozzle 12 arranged at a front end of the cylinder 11. In addition, the injection unit 10 has a screw 20 arranged in the cylinder 11 so as to be rotatable and capable of advancing and retreating in a rotation axis direction, heaters h11, h12, and h13 as heating sources heating the cylinder 11, and a drive unit 60 arranged on the rear side of the cylinder 11.

The screw 20, which has a screw main body 21 and an injection portion 22 arranged in front of the screw main body 21, is connected to the drive unit 60 via a rear end shaft portion. The screw main body 21 has a flight portion 23 and a pressure member 24 arranged so as to be detachable with respect to a front end of the flight portion 23. The flight portion 23 has a rod-shaped main body portion 23a and a helical flight 23b formed so as to protrude from an outer peripheral surface of the main body portion 23a, and a helical screw groove 26 is formed along the flight 23b. It can be exemplified that the depth of the screw groove 26 is constant and the screw compression ratio is constant from a rear end to the front end of the flight portion 23.

It should be noted that the screw 20 may not have the pressure member 24 and the flight portion 23 may be formed over the entire screw main body 21. In addition, from a rear end to a front end, the screw main body 21 may be divided into a supply unit where a resin is supplied, a compression zone where the supplied resin is melted while being compressed, and a metering zone where the molten resin is metered in fixed amounts. It is preferable that the depth of the screw groove 26 is the deepest in the supply unit, is the shallowest in the metering zone, and becomes shallow from the rear side toward the front side in the compression zone.

The injection portion 22 has a head portion 31 having a tip provided with a conical part, a rod portion 32 formed adjacent to the rear side of the head portion 31, a check ring 33 arranged around the rod portion 32, and a seal ring 34 attached to a front end of the pressure member 24.

During the plasticizing process, the check ring 33 is moved to the front side with respect to the rod portion 32 and is separated from the seal ring 34 as the screw 20 moves rearward, and then the resin is sent from the rear side of the injection portion 22 to the front side. In addition, during the injection process, the check ring 33 is moved to the rear side with respect to the rod portion 32 and is brought into contact with the seal ring 34 as the screw 20 moves forward, and then a resin backflow is prevented.

A resin feed port 14 as a molding material feed port is formed in a rear portion of the cylinder 11. The resin feed port 14 is formed at a point facing a rear end portion of the screw groove 26 with the screw 20 positioned on the foremost side in the cylinder 11. The material supply device 81 supplying a resin into the cylinder 11 is attached to the resin feed port 14.

The drive unit 60 rotates the screw 20 or causes the screw 20 to advance and retreat in the cylinder 11. The drive unit 60 has a plasticizing motor 61 as a drive source rotating the screw 20 in the cylinder 11 and an injection motor 71 as a drive source moving the screw 20 in the rotation axis direction in the cylinder 11. It can be exemplified that the plasticizing motor 61 and the injection motor 71 are servo-motors.

Provided between the injection motor 71 and the screw 20 is, for example, a motion conversion mechanism converting rotary motion of the injection motor 71 into linear motion of the screw 20. For example, the motion conversion mechanism has a screw shaft and a screw nut screwing onto the screw shaft. It can be exemplified that a ball, a roller, or the like is provided between the screw shaft and the screw nut. The drive source that moves the screw 20 in the rotation axis direction is not limited to the injection motor 71 and may be, for example, a hydraulic cylinder.

Material Supply Device 81

The material supply device 81 has a hopper 82 accommodating a molding material (such as resin pellets), a feed cylinder 83 extending in a horizontal direction from a lower end of the hopper 82, and a tubular guide portion 84 extending downward from a front end of the feed cylinder 83. In addition, the material supply device 81 has a feed screw 85 rotatably arranged in the feed cylinder 83 and a feed motor 86 rotating the feed screw 85.

The resin supplied from the inside of the hopper 82 into the feed cylinder 83 is moved forward along the screw groove of the feed screw 85 as the feed screw 85 rotates. The resin sent from a front end of the feed screw 85 into the guide portion 84 drops in the guide portion 84 and is supplied into the cylinder 11.

It should be noted that the feed cylinder 83 does not necessarily have to extend in the horizontal direction and may, for example, extend obliquely with respect to the horizontal direction. In addition, the feed cylinder 83 may be higher on an outlet side than on an inlet side.

In addition, the resin supplied into the feed cylinder 83 may be heated by a heater (not illustrated). At this time, the resin is preferably heated to a non-melting temperature such as a predetermined temperature equal to or lower than the glass transition point.

Control Device 40

The control device 40 has a CPU 41, a ROM 42 storing a control program or the like, a readable and writable RAM 43 storing a calculation result or the like, a storage unit 44 such as a hard disk, an input interface (I/F) 45, and an output interface (I/F) 46. The control device 40 implements various functions by causing the CPU 41 to execute a program stored in the ROM 42, the storage unit 44, or the like.

The control device 40 may have a motor control unit 47 controlling the drive of the plasticizing motor 61, the injection motor 71, the feed motor 86, and the like, a heater control unit 48 controlling the temperatures of the heaters h11 to h13, and a parameter correction unit 49 correcting a molding parameter in molding a molding product 3.

Operation of Injection Molding Machine 2

The operation of the injection molding machine 2 controlled by the control device 40 will be described below. In the plasticizing process, the motor control unit 47 of the control device 40 drives the plasticizing motor 61 to rotate the screw 20. At this time, the motor control unit 47 drives the feed motor 86 to rotate the feed screw 85. It can be exemplified that the motor control unit 47 synchronously rotates the screw 20 and the feed screw 85 during molding. The motor control unit 47 controls the current supplied to the plasticizing motor 61 such that the rotational speed of the screw 20 reaches, for example, a rotational speed set via the operation unit 51. In addition, the motor control unit 47 controls the current supplied to the feed motor 86 such that the rotational speed of the feed screw 85 reaches, for example, a rotational speed set via the operation unit 51.

The resin supplied into the cylinder 11 by the material supply device 81 is immediately sent to the front side by the screw 20 without staying at the resin feed port 14. The screw groove 26 of the screw 20 is not densely filled with the resin, and the resin in the screw groove 26 is in a sparse state. Accordingly, the amount of the resin that is sent to the front side by the screw 20 per unit time increases as the speed of the resin supply by the material supply device 81 increases.

The resin supplied into the cylinder 11 is moved forward along the screw groove 26 of the screw 20 as the screw 20 rotates and is heated and melted by the heaters h11 to h13. The heater control unit 48 of the control device 40 controls the electric power supplied to the heaters h11 to h13 such that the temperatures of the heaters h11 to h13 reach, for example, temperatures set via the operation unit 51.

In addition, the resin supplied into the cylinder 11 is gradually pressurized from a pressure rise start position of the resin in the screw main body 21 to the front end of the screw main body 21. The pressure rise start position is at a predetermined distance to the rear side from the pressure member 24 and is displaced in accordance with, for example, the ratio (synchronization rate) between the rotational speed of the screw 20 and the rotational speed of the feed screw 85. On the condition that the pressure rise start position is at a distance within a predetermined range from the pressure member 24, the molten state of the resin is stabilized, and the weight of the molding product is stabilized.

The resin moved forward along the screw groove 26 of the screw 20 passes through the resin flow path between the pressure member 24 and the cylinder 11, is kneaded therebetween, and then passes through the resin flow path between the cylinder 11 and the rod portion 32 and is moved forward. Then, the resin is sent to the front side of the screw 20 and is accumulated in the cylinder front portion. The screw 20 moves rearward as the molten resin is accumulated on the front side of the screw 20.

In the plasticizing process, the motor control unit 47 of the control device 40 controls the current supplied to the injection motor 71 such that the back pressure of the screw 20 reaches, for example, a back pressure set via the operation unit 51. By back pressure application to the screw 20, a rapid rearward movement of the screw 20 is suppressed, the kneadability of the resin is improved, and gas in the resin is capable of easily escaping to the rear side.

The motor control unit 47 monitors the position of the screw 20 with a position sensor (not illustrated) while the screw 20 is moved rearward. The control device 40 stops the drive of the plasticizing motor 61 when the screw 20 is moved rearward up to a plasticizing completion position, and a predetermined amount of resin is accumulated on the front side of the screw 20. As a result, the rotation of the screw 20 is stopped, and the plasticizing process is completed. It can be exemplified that the motor control unit 47 stops the drive of the feed motor 86 and stops the rotation of the feed screw 85 simultaneously with the plasticizing process completion.

In the filling process, the motor control unit 47 of the control device 40 drives the injection motor 71 to move the screw 20 forward and to push the resin into a cavity space in the mold unit that is clamped. At that time, the motor control unit 47 controls the current supplied to the injection motor 71 such that the movement speed of the screw 20 in the rotation axis direction reaches, for example, a movement speed set via the operation unit 51.

In the holding pressure process, the motor control unit 47 controls the current supplied to the injection motor 71 such that the pressure of the resin reaches, for example, a pressure set via the operation unit 51. As a result, the resin with which the cavity space is filled shrinks by cooling, and yet resin replenishment is performed by the shrinkage amount.

It should be noted that the setting values that the motor control unit 47 uses in controlling the various motors (e.g., rotational speed, movement speed, pressure) and the temperature setting value that the heater control unit 48 uses in controlling the heaters h11 to h13 are stored as molding parameters in, for example, the ROM 42 or the storage unit 44.

The processing device 120 of the inspection apparatus 100 sends molding product quality determination to the parameter correction unit 49. The parameter correction unit 49 corrects a molding parameter in molding the molding product 3 for the next and subsequent molding, using the determination result that the molding product 3 is defective output from the processing device 120 and the molding parameter in molding the molding product 3 in the injection molding machine 2.

In a case where the processing device 120 outputs the determination result that the molding product 3 is defective, the parameter correction unit 49 determines that the molding parameter in molding the molding product 3 in the injection molding machine 2 is not satisfactory. It can be exemplified that the molding parameter is the movement speed of the screw 20 in the filling process or the temperatures of the heaters h11 to h13. For example, it is conceivable that a change in stress distribution is caused by the mold unit for the molding product 3 wearing down and by the fluidity of the molten resin in the mold unit deteriorating. Accordingly, it can be exemplified that the parameter correction unit 49 changes at least one of the movement speed of the screw 20 and the temperatures of the heaters h11 to h13. This is because the fluidity of the molten resin in the mold unit improves as the movement speed of the screw 20 increases and the fluidity of the molten resin in the mold unit improves as the temperatures of the heaters h11 to h13 rise and the temperature of the molten resin rises.

Inspection Apparatus 100

As illustrated in FIG. 1, the inspection apparatus 100 has an imaging device 110 imaging the molding product 3 and the processing device 120 processing the image output from the imaging device 110.

Imaging Device 110

Figure 3:
FIG. 3 is a diagram illustrating an example of a schematic configuration of an imaging device.
Figure 3:
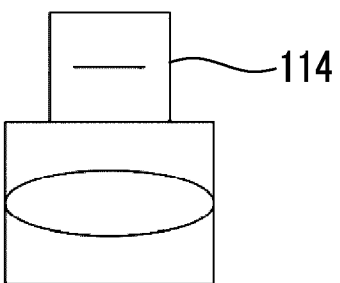
Figure 4:
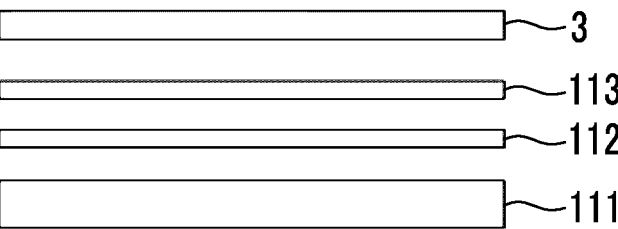
FIG. 4 is a diagram illustrating an example of polarization images acquired by the imaging device.

FIG. 3 is a diagram illustrating an example of a schematic configuration of the imaging device 110. FIG. 4 is a diagram illustrating an example of polarization images acquired by the imaging device 110.

The imaging device 110 acquires polarization images of the molding product 3 including a plurality of polarization channels by targeting the molding product 3 molded by the injection molding machine 2. The polarization image means an image of an imaging target projected by refraction and reflection of polarized light. If the same imaging target is imaged from the same angle, the same direction, and the same distance with different types of polarized light, different images of the same subject are obtained. In other words, by performing imaging using a plurality of types of polarized light, images of a plurality of components can be obtained for the same subject. The polarization channel means an image of one component among the images of the plurality of components.

The imaging device 110 may have a light source 111 generating light, a linear polarizer 112 producing linearly polarized light from the light emitted from the light source 111, a wave plate 113 converting the linearly polarized light produced by the linear polarizer 112 into circularly polarized light, and a polarization camera 114.

The light source 111 can be exemplified by lighting such as a lamp, an incandescent lamp, a fluorescent lamp, and an LED. The light emitted from the light source 111 is not limited to visible light and may be infrared light. Light with a wavelength of 360 nm to 900 nm is desirable.

The linear polarizer 112 is an optical element producing linearly polarized light from the light emitted from the light source 111.

The wave plate 113 can be exemplified as a ¼ wave plate producing a phase difference of 90 degrees.

It can be exemplified that the polarization camera 114 is a camera in which polarizers of 0, 45, 90, and 135 degrees are regularly disposed between an imaging element and a lens and which is capable of acquiring polarization images including four polarization channels corresponding to the above four polarization angles by single imaging. Further, the polarization camera 114 may be a camera capable of generating an image obtained by calculating the direction and degree of polarization using the polarization image (e.g., the four basic arithmetic operations, trigonometric function operations, and inverse trigonometric function operations).

In the imaging device 110 configured as described above, the molding product 3 molded by the injection molding machine 2 may be disposed above the wave plate 113, and the light transmitted through the molding product 3 may be imaged by the polarization camera 114.

As illustrated in FIG. 4, polarization images of four polarization channels corresponding to four polarization angles can be acquired as a result of the imaging described above.

It should be noted that in the imaging device 110, linearly polarized light transmitted through the linear polarizer 112 may be made incident into the molding product 3 without using the wave plate 113. However, in the case of a configuration in which linearly polarized light is made incident into the molding product 3, the light cannot be transmitted through the molding product 3 in a case where a main axis direction of the molding product 3 is orthogonal to a polarization direction, and thus, information may be lost. Accordingly, it is desirable to make circularly polarized light incident into the molding product 3 using the wave plate 113. By making circularly polarized light incident into the molding product 3, loss of information can be suppressed.

In addition, the wave plate 113 may be a λ/2 plate. The polarization direction can be vertically rotated when a λ/2 plate with an optical axis tilted to an azimuth angle of 45 degrees is used as the wave plate 113. As a result, the linearly polarized light transmitted through the linear polarizer 112 can be made incident into the molding product 3 with the polarization direction changed, and an information loss phenomenon can be suppressed. In other words, in a state where the main axis direction of the molding product 3 is orthogonal to the polarization direction and no light can be transmitted through the molding product 3, it is impossible to output a striped image corresponding to the stress distribution to be measured, and thus, it is possible to suppress information loss attributable to light being incapable of transmission through the molding product 3 by vertically inverting the direction of polarization using a λ/2 plate.

In addition, the wave plate 113 may be, for example, a λ/8 plate converting linearly polarized light into elliptically polarized light.

Modification Example of Polarization Camera

Figure 5:
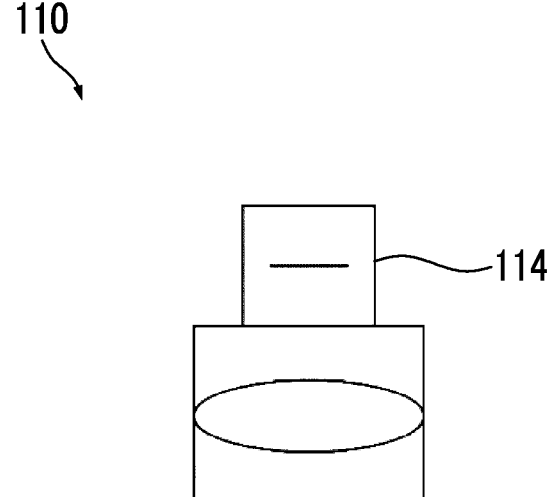
FIG. 5 is a diagram illustrating an example of a schematic configuration of an imaging device of Modification Example 1.
Figure 5:
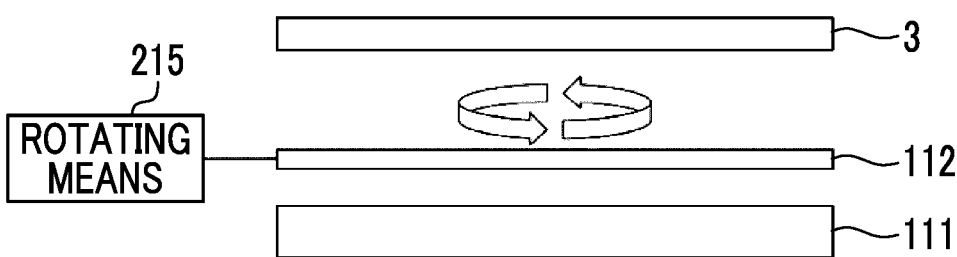
Figure 6:
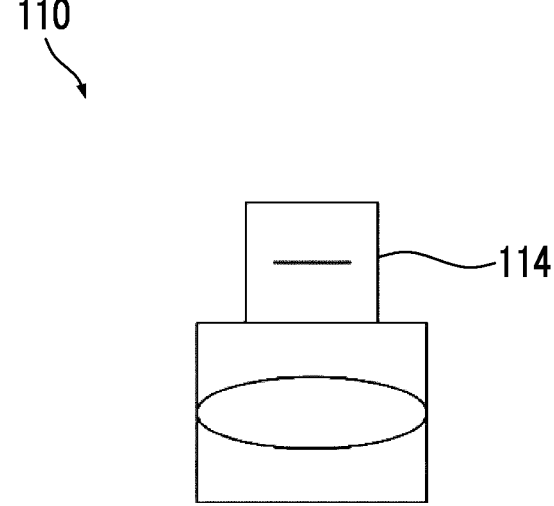
FIG. 6 is a diagram illustrating an example of a schematic configuration of an imaging device of Modification Example 2.
Figure 6:
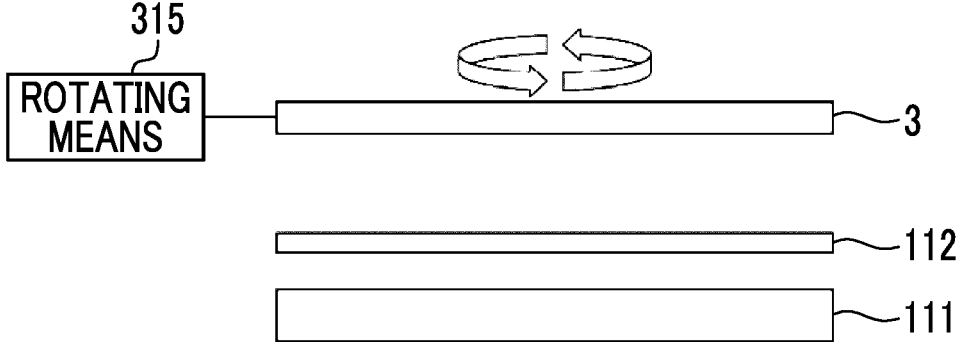
Figure 7:
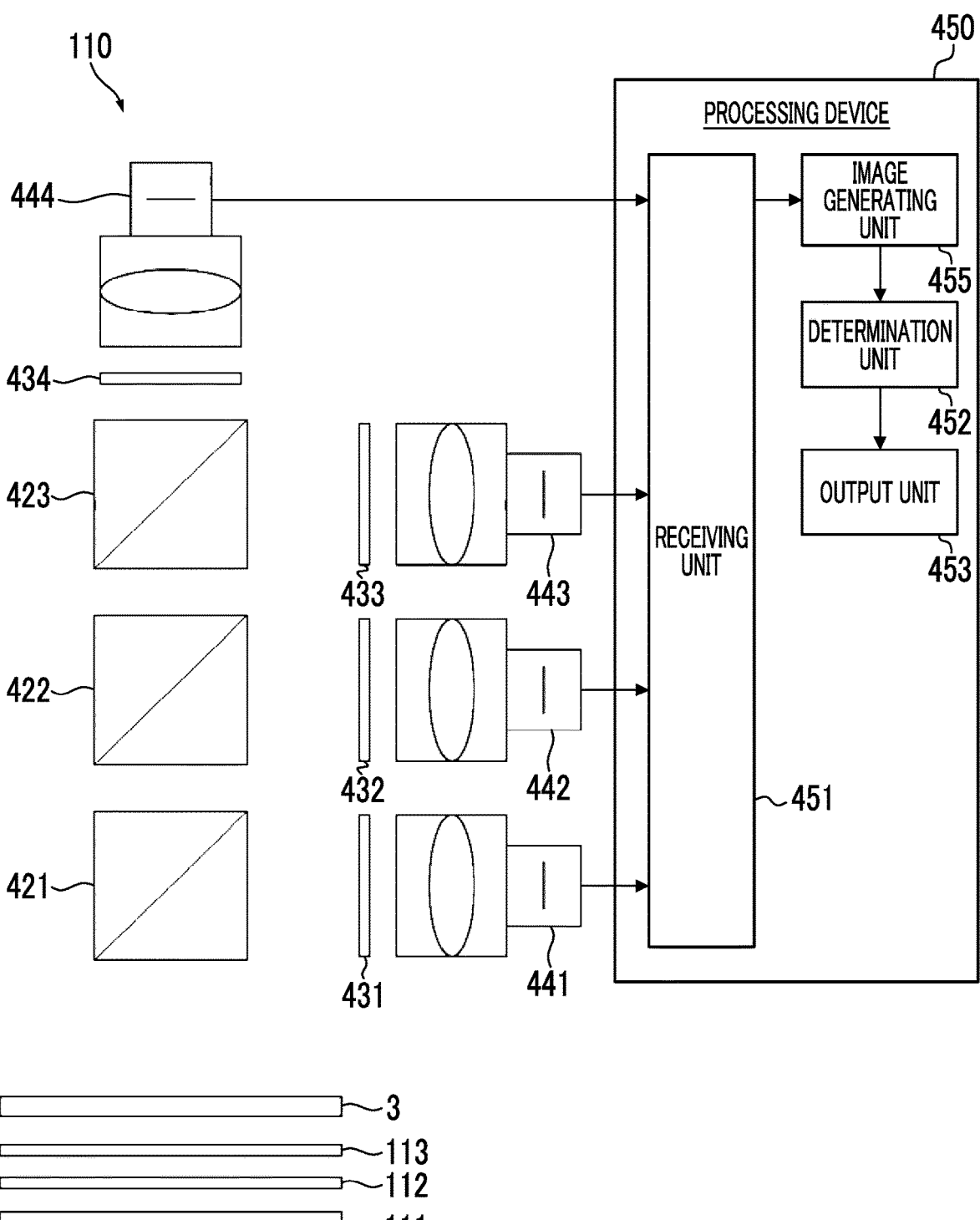
FIG. 7 is a diagram illustrating an example of a schematic configuration of an imaging device of Modification Example 3.

FIG. 5 is a diagram illustrating an example of a schematic configuration of the imaging device 110 of Modification Example 1. FIG. 6 is a diagram illustrating an example of a schematic configuration of the imaging device 110 of Modification Example 2. FIG. 7 is a diagram illustrating an example of a schematic configuration of the imaging device 110 of Modification Example 3. Next, the modification examples of the imaging device 110 described above will be described. The same reference numerals are used for elements similar to those of the imaging device 110 described above, and detailed description thereof will be omitted.

Modification Example 1

As illustrated in FIG. 5, the imaging device 110 according to Modification Example 1 has the light source 111, the linear polarizer 112, the polarization camera 114, and rotating means 215 for rotating the linear polarizer 112. The rotating means 215 rotates the film-shaped linear polarizer 112 by 45, 90, and 135 degrees around a line orthogonal to a plate surface as a rotation center.

In the imaging device 110 configured as described above, the molding product 3 molded by the injection molding machine 2 is disposed above the linear polarizer 112, and the light transmitted through the molding product 3 is imaged by the polarization camera 114. Further, the rotating means 215 rotates the linear polarizer 112 by 45, 90, and 135 degrees, and the polarization camera 114 images the light transmitted through the molding product 3 at each rotation angle. The polarization camera 114 acquires images corresponding to the above four polarization angles at the rotation angles of 0, 45, 90, and 135 degrees and an image obtained by calculating the direction and degree of polarization using the images. It should be noted that the rotating means 215 for rotating the linear polarizer 112 is not particularly limited in terms of configuration and rotation method. The linear polarizer 112 may be rotated by a robot or manually.

In addition, with the imaging device 110 configured as described above, polarization images (FIG. 4) of four polarization channels corresponding to four polarization angles can be acquired.

Modification Example 2

As illustrated in FIG. 6, the imaging device 110 according to Modification Example 2 has the light source 111, the linear polarizer 112, the polarization camera 114, and rotating means 315 for rotating the molding product 3. The rotating means 315 rotates the molding product 3 by 45, 90, and 135 degrees around a line orthogonal to the plate surface of the film-shaped linear polarizer 112 as a rotation center.

In the imaging device 110 configured as described above, the molding product 3 molded by the injection molding machine 2 is disposed above the linear polarizer 112, and the light transmitted through the molding product 3 is imaged by the polarization camera 114. Further, the rotating means 315 rotates the molding product 3 by 45, 90, and 135 degrees, and the polarization camera 114 images the light transmitted through the molding product 3 at each rotation angle. The polarization camera 114 acquires images corresponding to the above four polarization angles at the rotation angles of 0, 45, 90, and 135 degrees and an image obtained by calculating the direction and degree of polarization using the images. It should be noted that the rotating means 315 for rotating the molding product 3 is not particularly limited in terms of configuration and rotation method. The molding product 3 may be rotated by a robot or manually.

In addition, with the imaging device 110 configured as described above, polarization images (FIG. 4) of four polarization channels corresponding to four polarization angles can be acquired.

Modification Example 3

As illustrated in FIG. 7, the imaging device 110 according to Modification Example 3 has the light source 111, the linear polarizer 112, and the wave plate 113. In addition, the imaging device 110 has a first beam splitter 421 partially reflecting and partially transmitting the light emitted from the light source 111, a second beam splitter 422 partially reflecting and partially transmitting the light transmitted through the first beam splitter 421, and a third beam splitter 423 partially reflecting and partially transmitting the light transmitted through the second beam splitter 422. In addition, the imaging device 110 has a first linear polarizer 431 producing linearly polarized light from the light reflected by the first beam splitter 421 and a first camera 441 imaging the light transmitted through the first linear polarizer 431. In addition, the imaging device 110 has a second linear polarizer 432 producing linearly polarized light from the light reflected by the second beam splitter 422 and a second camera 442 imaging the light transmitted through the second linear polarizer 432. In addition, the imaging device 110 has a third linear polarizer 433 producing linearly polarized light from the light reflected by the third beam splitter 423 and a third camera 443 imaging the light transmitted through the third linear polarizer 433. In addition, the imaging device 110 has a fourth linear polarizer 434 producing linearly polarized light from the light transmitted through the third beam splitter 423 and a fourth camera 444 imaging the light transmitted through the fourth linear polarizer 434.

Although the first camera 441, the second camera 442, the third camera 443, and the fourth camera 444 have imaging elements and lenses, the first camera 441, the second camera 442, the third camera 443, and the fourth camera 444 are, unlike the polarization camera 114, general cameras that do not have polarizers of 0, 45, 90, and 135 degrees.

The polarization axis (transmission axis) of the second linear polarizer 432 is inclined by 45 degrees with respect to the polarization axis of the first linear polarizer 431. The polarization axis (transmission axis) of the third linear polarizer 433 is inclined by 90 degrees with respect to the polarization axis of the first linear polarizer 431. The polarization axis (transmission axis) of the fourth linear polarizer 434 is inclined by 135 degrees with respect to the polarization axis of the first linear polarizer 431.

In the imaging device 110 configured as described above, the molding product 3 molded by the injection molding machine 2 is disposed above the wave plate 113, and the light transmitted through the molding product 3 is imaged by the first camera 441, the second camera 442, the third camera 443, and the fourth camera 444.

In addition, with the imaging device 110 configured as described above, polarization images (FIG. 4) of four polarization channels corresponding to four polarization angles can be acquired.

Processing Device 120

As illustrated in FIG. 1, the processing device 120 has a CPU 121, a ROM 122 storing a control program or the like, a readable and writable RAM 123 storing a calculation result or the like, a storage unit 124 such as a hard disk, an input interface (I/F) 125, and an output interface (I/F) 126. The processing device 120 implements various functions by causing the CPU 121 to execute a program stored in the ROM 122, the storage unit 124, or the like.

As illustrated in FIG. 2, the processing device 120 has a receiving unit 131 receiving the polarization image of the molding product 3 output from the imaging device 110, a determination unit 132 determining the quality of the molding product 3 using the polarization image of the molding product 3 received by the receiving unit 131, and an output unit 133 outputting the determination result of the determination unit 132 to the control device 40.

Figure 8:
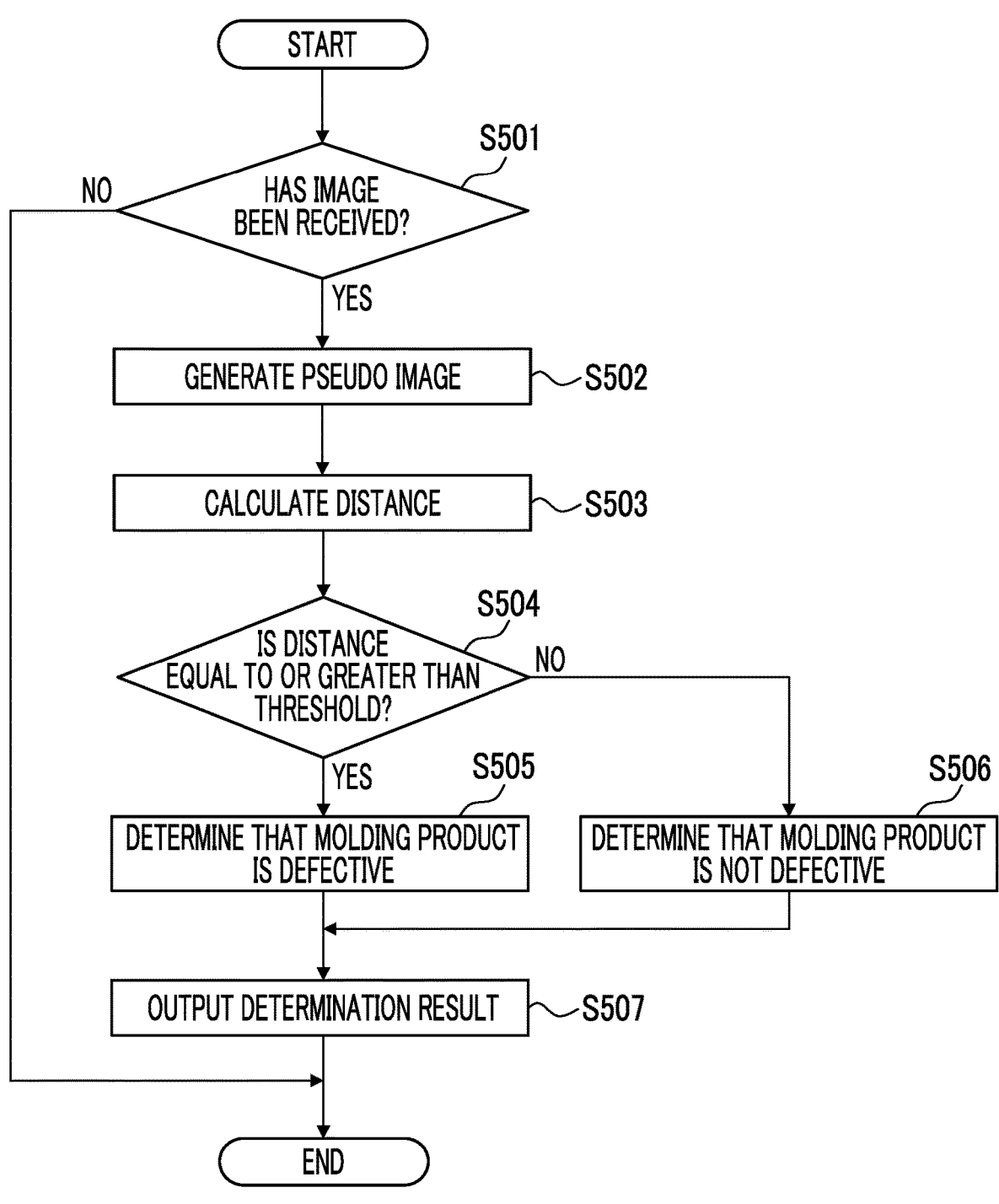
FIG. 8 is a flowchart illustrating an example of a procedure of inspection processing performed by the processing device.

FIG. 8 is a flowchart illustrating an example of the procedure of the inspection processing that is performed by the processing device 120.

The processing device 120 repeatedly executes this processing at, for example, a predetermined control cycle (e.g., every second).

The processing device 120 determines whether or not the receiving unit 131 has received the polarization image of the molding product 3 from the imaging device 110 (S501). In a case where the polarization image has not been received (NO in S501), the processing device 120 ends the inspection processing. On the other hand, in a case where the polarization image has been received (YES in S501), the processing device 120 inputs the polarization image received in S501 or a calculation image calculated from the polarization image to an image generating unit 132a to generate a pseudo image (S502). Then, the processing device 120 calculates the distance between the polarization image or the calculation image and the pseudo image (S503). After that, the processing device 120 determines whether or not the distance calculated in S503 is equal to or greater than a predetermined threshold (S504). Then, in a case where the distance is equal to or greater than the threshold (YES in S504), the processing device 120 determines that the molding product 3 is abnormal (defective) (S505). On the other hand, in a case where the distance is less than the threshold (NO in S504), the processing device 120 determines that the molding product 3 is normal (not defective) (S506). After that, the processing device 120 outputs the determination result as to whether the molding product 3 is defective or not to the control device 40 (S507). The processing of S502, S503, S504, S505, and S506 is performed by the determination unit 132, and the processing of S507 is performed by the output unit 133. Determination Unit 132

Next, first to fifth embodiments will be described as to the configuration of the determination unit 132 and details of the inspection processing executed in steps S502 to S507 of FIG. 8. FIGS. 9 to 13 are diagrams for describing the determination units of the first to fifth embodiments, respectively.

Determination Unit of First Embodiment

Figure 9:
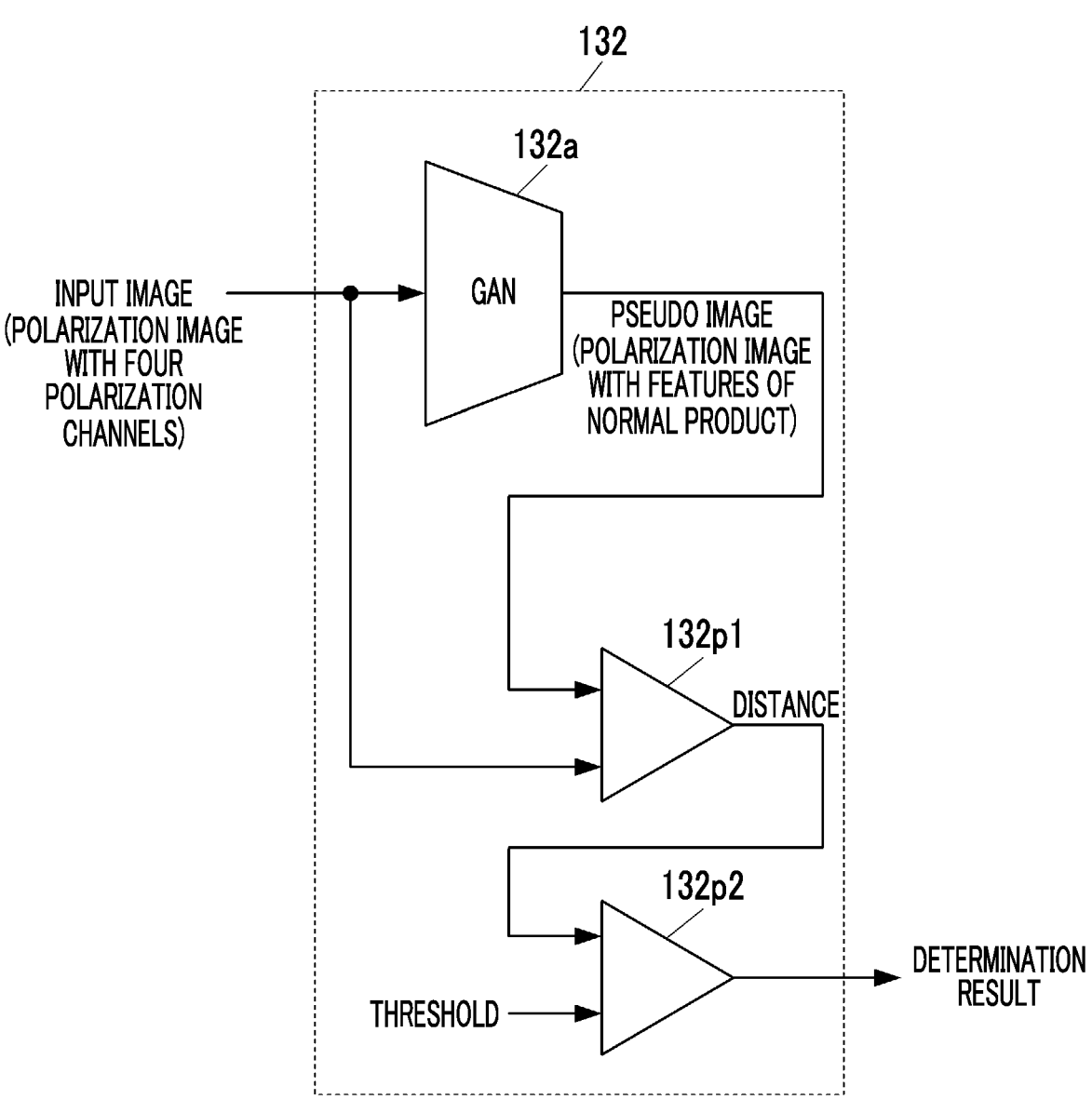
FIG. 9 is a diagram for describing the inspection processing of a first embodiment.

As illustrated in FIG. 9, the determination unit 132 has the image generating unit 132$a$ that generates a pseudo image from an input image in accordance with a machine-learned learning model. The determination unit 132 further has a processing unit 132$p1$ that calculates the distance between the pseudo image and the input image and a processing unit 132$p2$ that compares the distance with a threshold, and the determination unit 132 determines the quality of the molding product 3 based on the input image, a calculation image, and the pseudo image.

The image generating unit 132$a$ of the first embodiment inputs, as input images, polarization images with four polarization channels acquired by imaging a molding product to be inspected. Then, the image generating unit 132$a$ generates the polarization images with the four polarization channels as pseudo images. The image generating unit 132$a$ generates a pseudo image having features of a normal molding product even if the molding product of the input image includes an abnormality.

The image generating unit 132$a$ includes a generative adversarial network (GAN) as a learning model. The GAN is a learning model that includes a generator and a discriminator. With images of a plurality of non-abnormal (that is, normal) sample molding products provided in advance as training data, the learning model is machine-learned using the images. The plurality of sample molding products may include many sample molding products different in state within a normal range. Through such machine learning, the image generating unit 132$a$ generates a pseudo image including features of a normal molding product.

After obtaining the pseudo image, the determination unit 132 (processing unit 132$p1$) calculates the distance between the input image and the pseudo image. Then, the determination unit 132 (processing unit 132$p2$) determines that the molding product is normal if the distance is equal to or less than a threshold and determines that the molding product is abnormal if the distance exceeds the threshold.

In the determination result output processing (S507), the output unit 133 may output the input image, the pseudo image, and the determination result as to whether the product is normal or abnormal to the display unit 52. In addition, the determination unit 132 may display the distance between the input image and the pseudo image and a point where the distance is large for each pixel.

Various quantities can be adopted as the distance between the input image and the pseudo image insofar as the distance can be represented by the quantity. For example, the following three quantities can be adopted.

Firstly, the sum of differences between the input image and the pseudo image can be adopted as the distance. The sum of differences means a value obtained by summing differences (e.g., absolute or square difference value) in values (brightness values) of the same pixel in the same polarization channel for every polarization channel and every pixel.

Secondly, a quantity calculated using a certain variable value (a plurality of sets of values) on a latent variable space of the GAN of the image generating unit 132$a$ can be applied as the above distance. As the certain variable on the latent variable space, a variable that reflects the distance between the input image and the pseudo image can be found on the latent variable space and adopted. In a case where the value of the above variable is used, the sum of the above distance obtained from the above variable and a value obtained by applying a certain weight to the sum of differences of the images described above can be applied as a loss function representing the distance.

Thirdly, a known difference in image feature quantity can be applied as the distance. Accelerated KAZE (AKAZE), cosine similarity, histogram, and so on can be applied as classical image feature quantities.

According to the determination processing of the first embodiment, the image generating unit 132$a$ including a machine-learned learning model (GAN) is used to generate a pseudo image with features of a normal product. Therefore, the determination unit 132 is capable of obtaining, with small load, a pseudo image in a case where a molding product to be inspected is normal. Then, the determination unit 132 is capable of accurately determining the quality of the molding product by calculating the distance between the input image of the molding product to be inspected and the created pseudo image.

Figure 10:
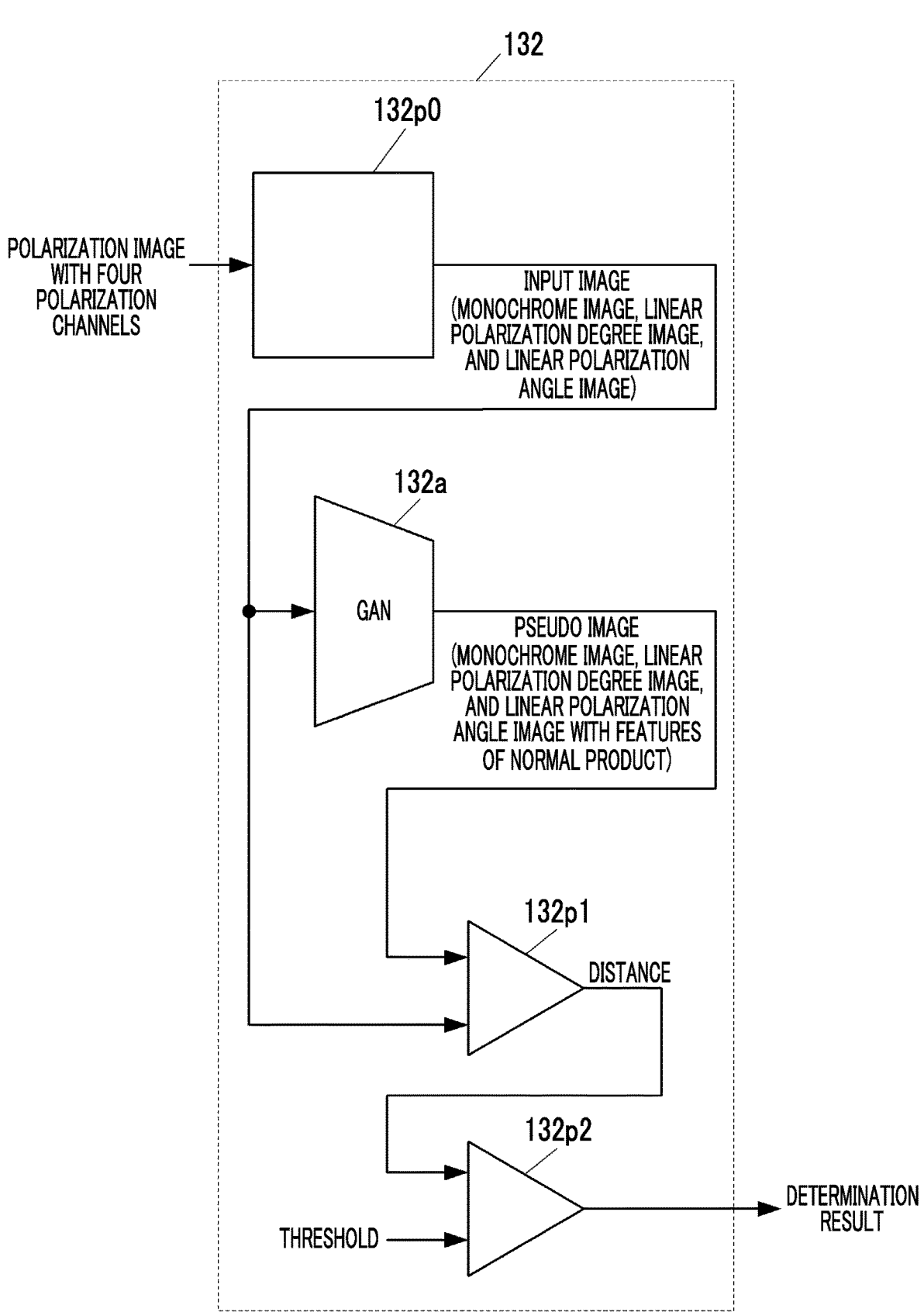
FIG. 10 is a diagram for describing the inspection processing of a second embodiment.

Further, according to the determination processing of the first embodiment, polarization images with four polarization channels are adopted as the input image and the pseudo image. The molding products of the injection molding machine 2 generally transmit light, and the quality depends on the magnitude of the internal stress. The above polarization image reflects the internal stress of the light-transmission molding product, and thus, quality determination as to the molding product of the injection molding machine 2 can be implemented with high accuracy by applying the above polarization images as the input image and the pseudo image. Determination Unit of Second Embodiment As illustrated in FIG. 10, the determination unit 132 has a processing unit 132$p0$ that calculates an input image from a polarization image and the image generating unit 132$a$ that generates a pseudo image from the input image in accordance with a machine-learned learning model. The determination unit 132 further has a processing unit 132$p1$ that calculates the distance between the pseudo image and the input image and a processing unit 132$p2$ that compares the distance with a threshold, and the determination unit 132 determines the quality of the molding product 3 based on the input image, a calculation image, and the pseudo image.

The image generating unit 132$a$ of the second embodiment inputs, as input images, three images, a monochrome image, a linear polarization degree image, and a linear polarization angle image of a molding product to be inspected. Then, the image generating unit 132$a$ generates a monochrome image, a linear polarization degree image, and a linear polarization angle image as pseudo images. The image generating unit 132$a$ generates a pseudo image having features of a normal molding product even if the molding product of the input image includes an abnormality. Specifically, the three images, the monochrome image, the linear polarization degree image, and the linear polarization angle image mean one image in which the pixel values of the monochrome image, the degree of polarization, and the polarization angle are assigned to three channels of each pixel.

The monochrome image, the linear polarization degree image, and the linear polarization angle image correspond to calculation images obtained by calculation from polarization images having four polarization channels. The monochrome image is an image in which the pixel value is the average value of the values of the same pixel in the four polarization channels. The linear polarization degree image is an image in which the value of each pixel corresponds to the degree of linear polarization (DoLP) at each pixel. The degree of linear polarization (DoLP) can be calculated from the values of the four polarization channels. The linear polarization angle image is an image in which the value of each pixel corresponds to the angle of linear polarization (AoLP) at each pixel. The angle of linear polarization (AoLP) can be calculated from the values of the four polarization channels. The calculation image may be generated by the determination unit 132 (processing unit 132$p$0) or by the imaging device 110.

The image generating unit 132$a$ includes a GAN as a learning model. With images of a plurality of non-abnormal (that is, normal) sample molding products provided in advance as training data, the learning model is machine-learned using the images. The plurality of sample molding products may include many sample molding products different in state within a normal range. Through such machine learning, the image generating unit 132$a$ generates a pseudo image including features of a normal molding product.

After obtaining the pseudo image, the determination unit 132 (processing unit 132$p$1) calculates the distance between the input image and the pseudo image. Then, the determination unit 132 (processing unit 132$p$2) determines that the molding product is normal if the distance is equal to or less than a threshold and determines that the molding product is abnormal if the distance exceeds the threshold.

In the determination result output processing (S507), the output unit 133 may output the input image, the pseudo image, and the determination result as to whether the product is normal or abnormal to the display unit 52. In addition, the determination unit 132 may display the distance between the input image and the pseudo image and a point where the distance is large for each pixel.

Various quantities can be adopted as the distance between the input image and the pseudo image insofar as the distance can be represented by the quantity. For example, the three quantities described above can be adopted. However, the first distance-indicating quantity among the three quantities described above is changed to the sum of differences between the input image and the pseudo image in a case where the components of the monochrome image, the linear polarization degree image, and the linear polarization angle image are three channel components.

According to the determination processing of the second embodiment, the image generating unit 132$a$ including a machine-learned learning model (GAN) is used to generate a pseudo image with features of a normal product. Therefore, the determination unit 132 is capable of obtaining, with small load, a pseudo image in a case where a molding product to be inspected is normal. Then, the determination unit 132 is capable of accurately determining the quality of the molding product by calculating the distance between the input image of the molding product to be inspected and the created pseudo image.

Further, according to the determination processing of the second embodiment, as the input image and the pseudo image, a set of three images is adopted that are a monochrome image, a linear polarization degree image, and a linear polarization angle image calculated from polarization images with four polarization channels. The molding products of the injection molding machine 2 generally transmit light, and the quality depends on the magnitude of the internal stress. The monochrome image, the linear polarization degree image, and the linear polarization angle image described above reflect the internal stress of the light-transmission molding product, and thus, quality determination as to the molding product of the injection molding machine 2 can be implemented with high accuracy by applying the above images as the input image and the pseudo image.

Determination Unit of Third Embodiment

Figure 11:
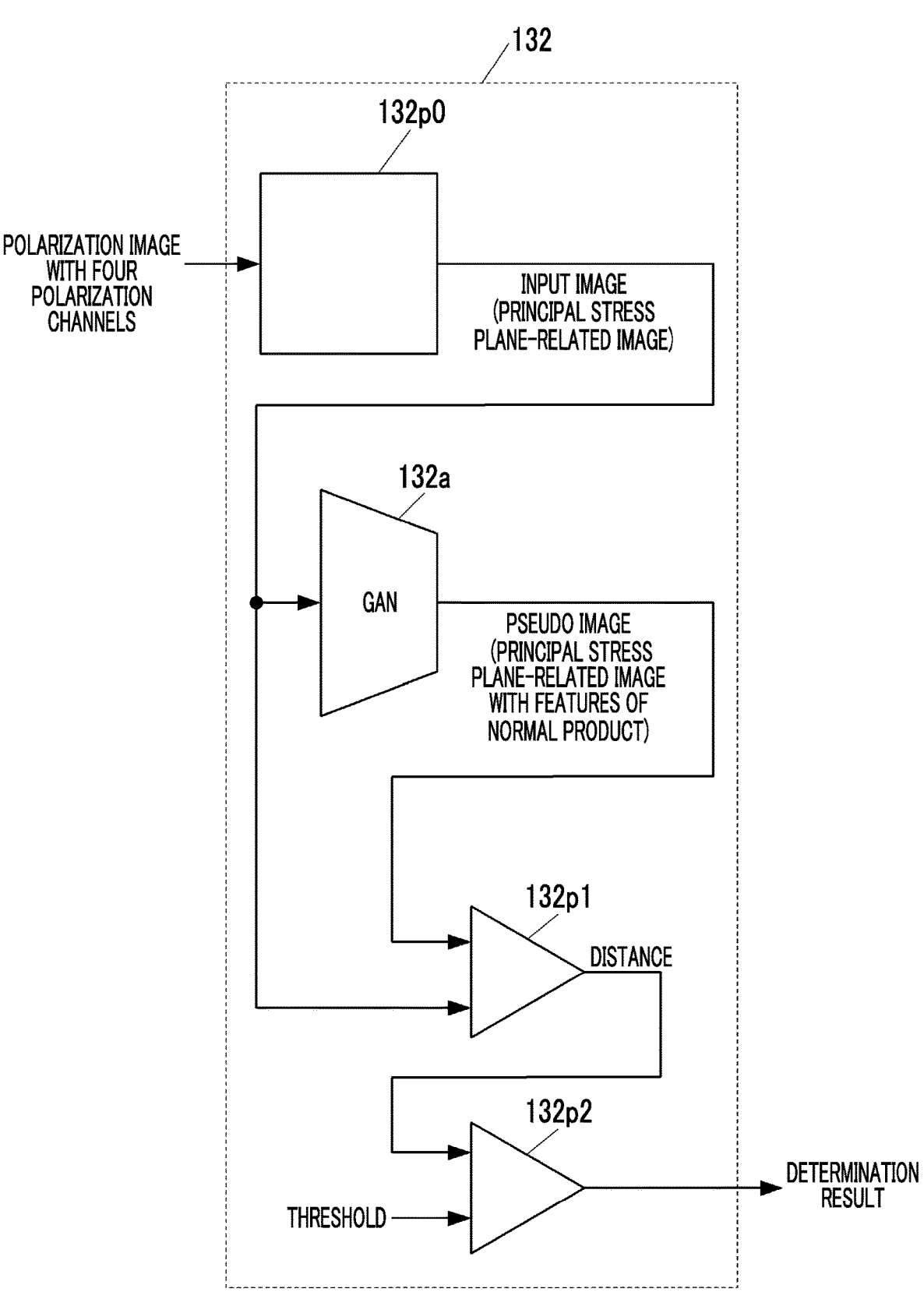
FIG. 11 is a diagram for describing the inspection processing of a third embodiment.

As illustrated in FIG. 11, the determination unit 132 has the processing unit 132$p$0 that calculates an input image from a polarization image and the image generating unit 132$a$ that generates a pseudo image from the input image in accordance with a machine-learned learning model. The determination unit 132 further has a processing unit 132$p$1 that calculates the distance between the pseudo image and the input image and a processing unit 132$p$2 that compares the distance with a threshold, and the determination unit 132 determines the quality of the molding product 3 based on the input image, a calculation image, and the pseudo image.

The image generating unit 132$a$ of the third embodiment inputs, as an input image, a principal stress plane-related image of a molding product to be inspected. Then, the image generating unit 132$a$ generates a stress-related image as a pseudo image. The image generating unit 132$a$ generates a pseudo image having features of a normal molding product even if the molding product of the input image includes an abnormality.

The principal stress plane-related image is an image related to the principal stress plane of the internal stress of the molding product such as a phase contrast image and a principal stress difference image. The phase contrast image is an image in which the pixel value indicates a phase difference. The phase difference here means the phase difference between polarized light perpendicular to the principal stress plane and polarized light parallel to the principal stress plane. The principal stress difference image is an image in which the pixel value indicates a principal stress difference. The principal stress plane-related image (phase contrast image and principal stress difference image) corresponds to a calculation image obtained by calculation from polarization images having four polarization channels. The calculation image may be generated by the determination unit 132 (processing unit 132$p$0) or by the imaging device 110.

It should be noted that an image further including the above monochrome image as a component of another channel may be applied as the principal stress plane-related image.

The image generating unit 132$a$ includes a GAN as a learning model. With images of a plurality of non-abnormal (that is, normal) sample molding products provided in advance as training data, the learning model is machine-learned using the images. The plurality of sample molding products may include many sample molding products different in state within a normal range. Through such machine learning, the image generating unit 132*a* generates a pseudo image including features of a normal molding product.

After obtaining the pseudo image, the determination unit 132 (processing unit 132*p*1) calculates the distance between the input image and the pseudo image. Then, the determination unit 132 (processing unit 132*p*2) determines that the molding product is normal if the distance is equal to or less than a threshold and determines that the molding product is abnormal if the distance exceeds the threshold.

In the determination result output processing (S507), the output unit 133 may output the input image, the pseudo image, and the determination result as to whether the product is normal or abnormal to the display unit 52. In addition, the determination unit 132 may display the distance between the input image and the pseudo image and a point where the distance is large for each pixel.

Various quantities can be adopted as the distance between the input image and the pseudo image insofar as the distance can be represented by the quantity. For example, the three quantities described above can be adopted. However, the first distance-indicating quantity among the three quantities described above is changed to the sum of differences calculated for each pixel value of the principal stress plane-related image.

According to the determination processing of the third embodiment, the image generating unit 132*a* including a machine-learned learning model (GAN) is used to generate a pseudo image with features of a normal product. Therefore, the determination unit 132 is capable of obtaining, with small load, a pseudo image in a case where a molding product to be inspected is normal. Then, the determination unit 132 is capable of accurately determining the quality of the molding product by calculating the distance between the input image of the molding product to be inspected and the created pseudo image.

Further, according to the determination processing of the third embodiment, a principal stress plane-related image is adopted as the input image and the pseudo image. The molding products of the injection molding machine 2 generally transmit light, and the quality depends on the magnitude of the internal stress. The principal stress plane-related image described above reflects the internal stress of the light-transmission molding product, and thus, quality determination as to the molding product of the injection molding machine 2 can be implemented with high accuracy by applying the above principal stress plane-related image as the input image and the pseudo image.

Determination Unit of Fourth Embodiment

Figure 12:
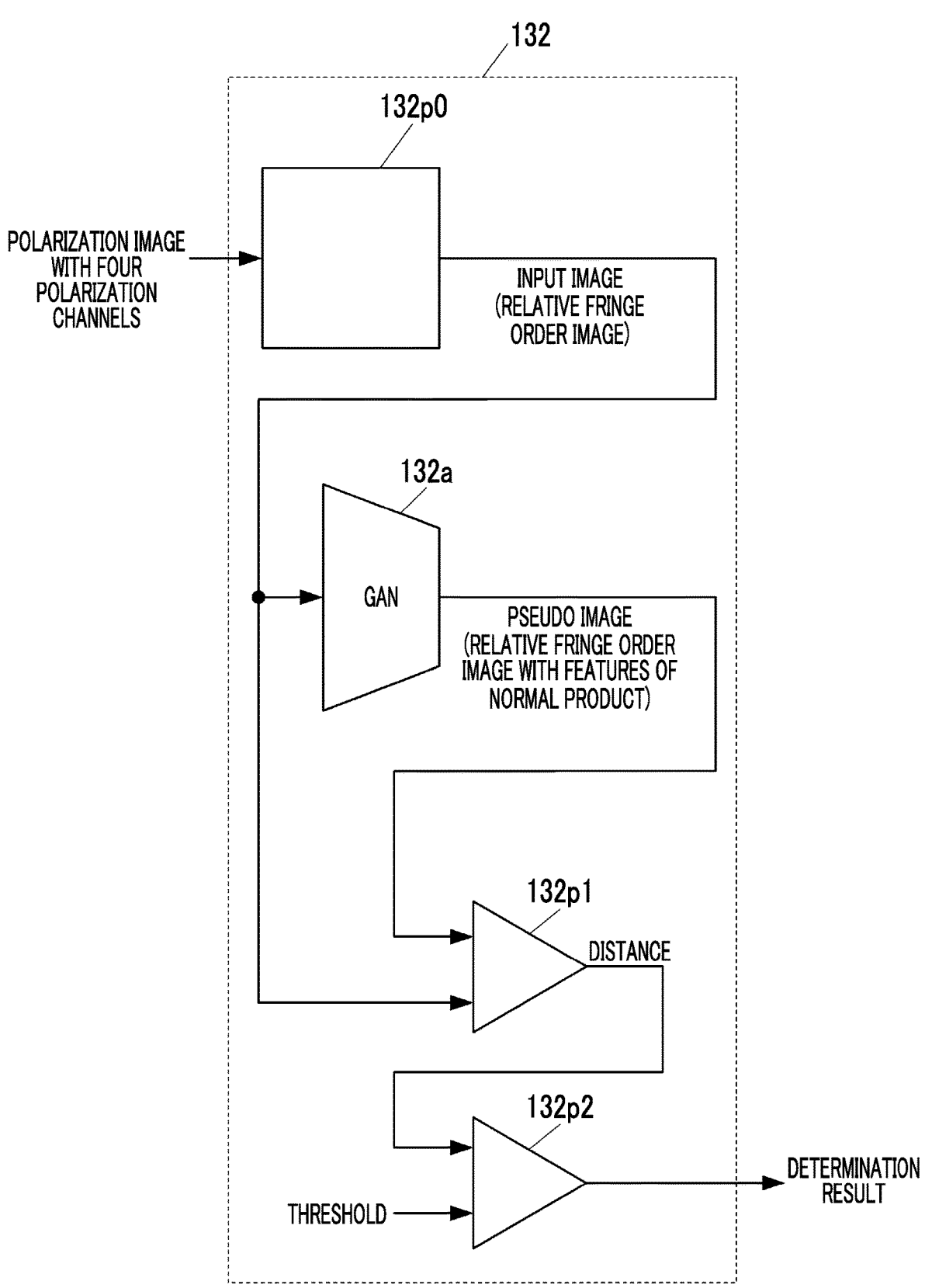
FIG. 12 is a diagram for describing the inspection processing of a fourth embodiment.

As illustrated in FIG. 12, the determination unit 132 has the processing unit 132*p*0 that calculates an input image from a polarization image and the image generating unit 132*a* that generates a pseudo image from the input image in accordance with a machine-learned learning model. The determination unit 132 further has a processing unit 132*p*1 that calculates the distance between the pseudo image and the input image and a processing unit 132*p*2 that compares the distance with a threshold, and the determination unit 132 determines the quality of the molding product 3 based on the input image, a calculation image, and the pseudo image.

The image generating unit 132*a* of the fourth embodiment inputs, as an input image, a relative fringe order image of a molding product to be inspected. Then, the image generating unit 132*a* generates a relative fringe order image as a pseudo image. The image generating unit 132*a* generates a pseudo image having features of a normal molding product even if the molding product of the input image includes an abnormality.

The relative fringe order image is a photoelastic fringe image obtained with a polarizer and corresponds to a calculation image obtained by calculation from polarization images having four polarization channels. The calculation image may be generated by the determination unit 132 (processing unit 132*p*0) or by the imaging device 110.

The image generating unit 132*a* includes a GAN as a learning model. With images of a plurality of non-abnormal (that is, normal) sample molding products provided in advance as training data, the learning model is machine-learned using the images. The plurality of sample molding products may include many sample molding products different in state within a normal range. Through such machine learning, the image generating unit 132*a* generates a pseudo image including features of a normal molding product.

After obtaining the pseudo image, the determination unit 132 (processing unit 132*p*1) calculates the distance between the input image and the pseudo image. Then, the determination unit 132 (processing unit 132*p*2) determines that the molding product is normal if the distance is equal to or less than a threshold and determines that the molding product is abnormal if the distance exceeds the threshold.

In the determination result output processing (S507), the output unit 133 may output the input image, the pseudo image, and the determination result as to whether the product is normal or abnormal to the display unit 52. In addition, the determination unit 132 may display the distance between the input image and the pseudo image and a point where the distance is large for each pixel.

Various quantities can be adopted as the distance between the input image and the pseudo image insofar as the distance can be represented by the quantity. For example, the three quantities described above can be adopted. However, the first distance-indicating quantity among the three quantities described above is changed to the sum of differences calculated for each pixel value of the relative fringe order image.

According to the determination processing of the fourth embodiment, the image generating unit 132*a* including a machine-learned learning model (GAN) is used to generate a pseudo image with features of a normal product. Therefore, the determination unit 132 is capable of obtaining, with small load, a pseudo image in a case where a molding product to be inspected is normal. Then, the determination unit 132 is capable of accurately determining the quality of the molding product by calculating the distance between the input image of the molding product to be inspected and the created pseudo image.

Further, according to the determination processing of the fourth embodiment, a relative fringe order image is adopted as the input image and the pseudo image. The molding products of the injection molding machine 2 generally transmit light, and the quality depends on the magnitude of the internal stress. The relative fringe order image described above reflects the internal stress of the light-transmission molding product, and thus, quality determination as to the molding product of the injection molding machine 2 can be implemented with high accuracy by applying the above relative fringe order image as the input image and the pseudo image.

Determination Unit of Fifth Embodiment

Figure 13:
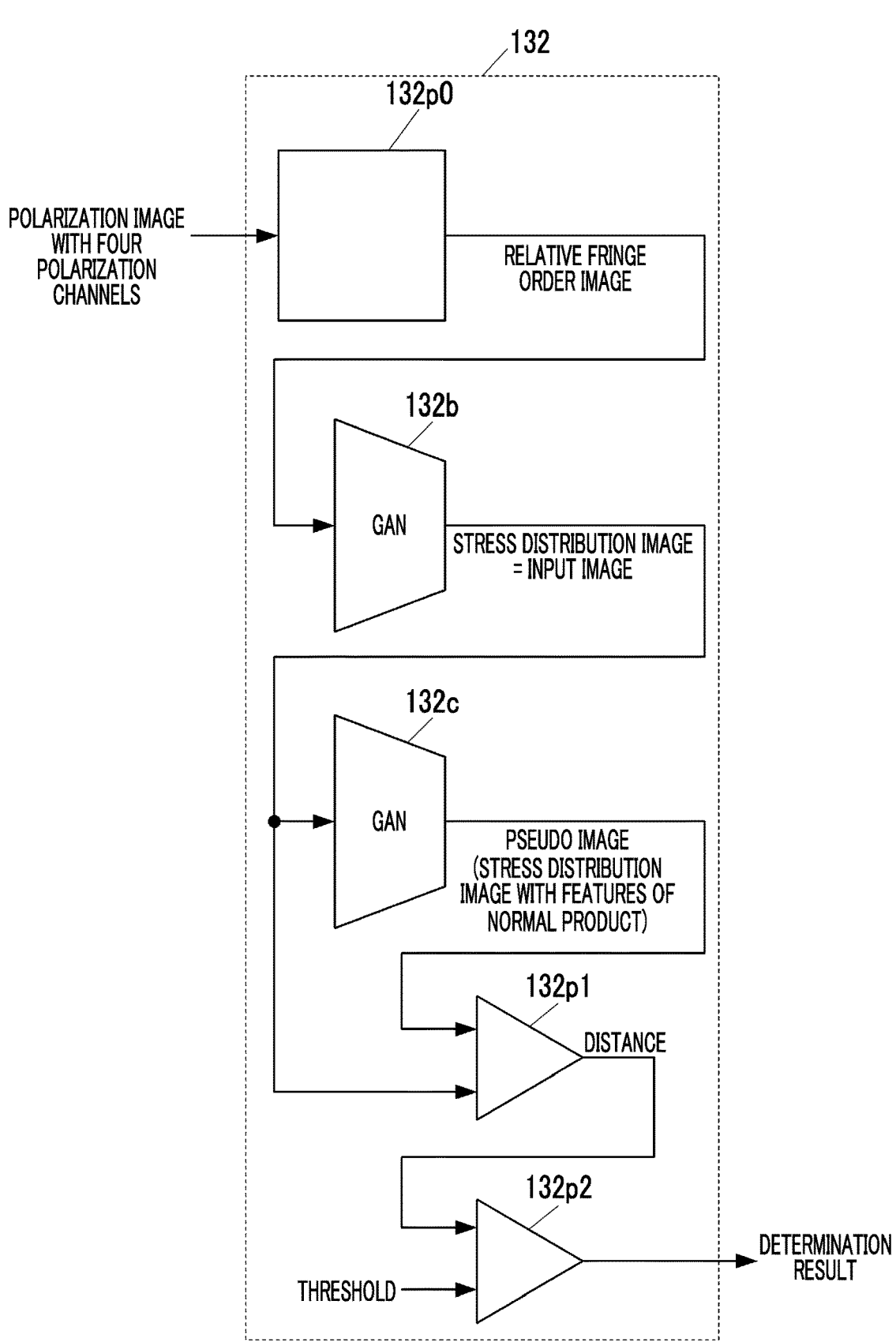
FIG. 13 is a diagram for describing the inspection processing of a fifth embodiment.

As illustrated in FIG. 13, the determination unit 132 has the processing unit 132*p*0 that calculates a relative fringe order image from a polarization image and a first image generating unit 132*b* and a second image generating unit 132*c* that generate an image in accordance with a machine-learned learning model. The determination unit 132 further has the processing unit 132*p*1 that calculates the distance between a pseudo image and an input image of the second image generating unit 132*c* and the processing unit 132*p*2 that compares the distance with a threshold, and the determination unit 132 determines the quality of the molding product 3 based on the input image, a calculation image, and the pseudo image.

The first image generating unit 132*b* inputs a relative fringe order image of a molding product to be inspected and outputs a stress distribution image reflecting the stress distribution of the molding product with high accuracy. The first image generating unit 132*b* includes a GAN as a first learning model. The first learning model is given in advance a relative fringe order image and a stress distribution image for a plurality of sample molding products as training data, and machine learning is performed such that a corresponding stress distribution image is output in a case where a relative fringe order image is input. The plurality of sample molding products may include many sample molding products different in state within a range including normality and abnormality. By such machine learning, the first image generating unit 132*b* is capable of outputting a stress distribution image that reflects the stress distribution of a molding product to be inspected with high accuracy.

The second image generating unit 132*c* inputs, as an input image, a stress distribution image of a molding product to be inspected. Then, the image generating unit 132*a* generates, as a pseudo image, a stress distribution image having features of a normal molding product even if the molding product to be inspected includes an abnormality.

The stress distribution image input to the second image generating unit 132*c* is an image generated by the first image generating unit 132*b* based on a relative fringe order image calculated from polarization images of four polarization channels. Therefore, the stress distribution image input to the second image generating unit 132*c* corresponds to a calculation image obtained by calculation from polarization images of four polarization channels.

The second image generating unit 132*c* includes a GAN as a second learning model. With images of a plurality of non-abnormal (that is, normal) sample molding products provided in advance as training data, the second learning model is machine-learned using the images. The plurality of sample molding products may include many sample molding products different in state within a normal range. Through such machine learning, the second image generating unit 132*c* generates a pseudo image including features of a normal molding product.

After obtaining the pseudo image, the determination unit 132 (processing unit 132*p*1) calculates the distance between the input image and the pseudo image. Then, the determination unit 132 (processing unit 132*p*2) determines that the molding product is normal if the distance is equal to or less than a threshold and determines that the molding product is abnormal if the distance exceeds the threshold.

Figure 14:
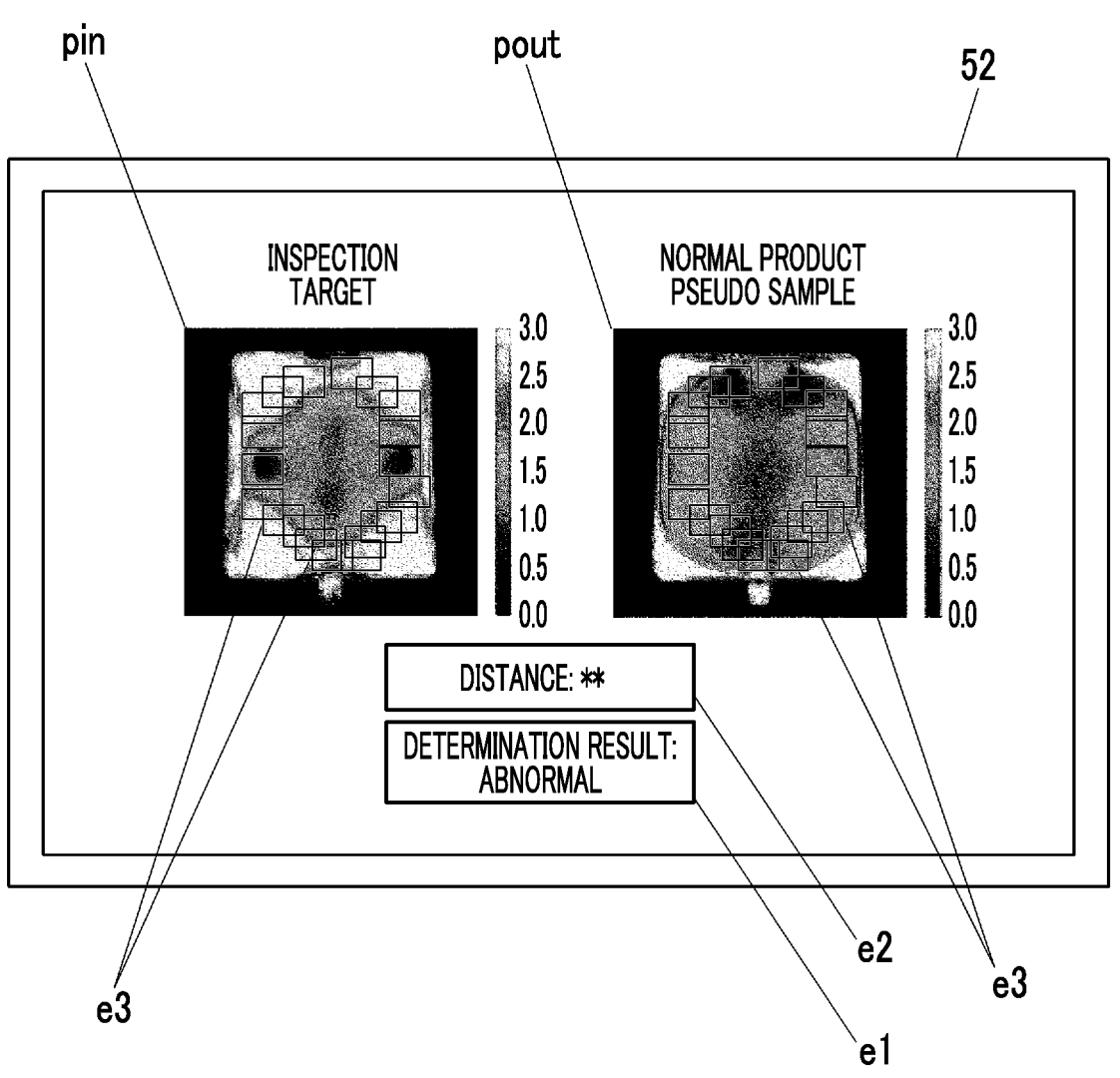
FIG. 14 is an image diagram illustrating an inspection result display example.

FIG. 14 is an image diagram illustrating an inspection result display example. In the determination result output processing (S507), the output unit 133 may output, to the display unit 52, an input image pin to the second image generating unit 132*c*, a pseudo image pout output by the second image generating unit 132*c*, and a determination result e1 as to whether the product is normal or abnormal. In addition, the determination unit 132 may display a distance e2 between the input image pin and the pseudo image pout and a point e3 where the distance is large for each pixel.

Various quantities can be adopted as the distance between the input image and the pseudo image insofar as the distance can be represented by the quantity. For example, the three quantities described above can be adopted. However, the first distance-indicating quantity among the three quantities described above is changed to the sum of differences calculated for each pixel value of the stress distribution image.

According to the determination processing of the fifth embodiment, the second image generating unit 132*c* including a machine-learned second learning model (GAN) is used to generate a pseudo image with features of a normal product. Therefore, the determination unit 132 is capable of obtaining, with small load, a pseudo image in a case where a molding product to be inspected is normal. Then, the determination unit 132 is capable of accurately determining the quality of the molding product by calculating the distance between the input image of the molding product to be inspected and the created pseudo image.

Further, according to the determination processing of the fifth embodiment, a stress distribution image is adopted as the input image and the pseudo image. The quality of the molding product of the injection molding machine 2 depends on the magnitude of the internal stress. The stress distribution image described above reflects the internal stress, and thus, quality determination as to the molding product of the injection molding machine 2 can be implemented with high accuracy by applying the above stress distribution image as the input image and the pseudo image.

Machine Learning Processing

Figure 15:
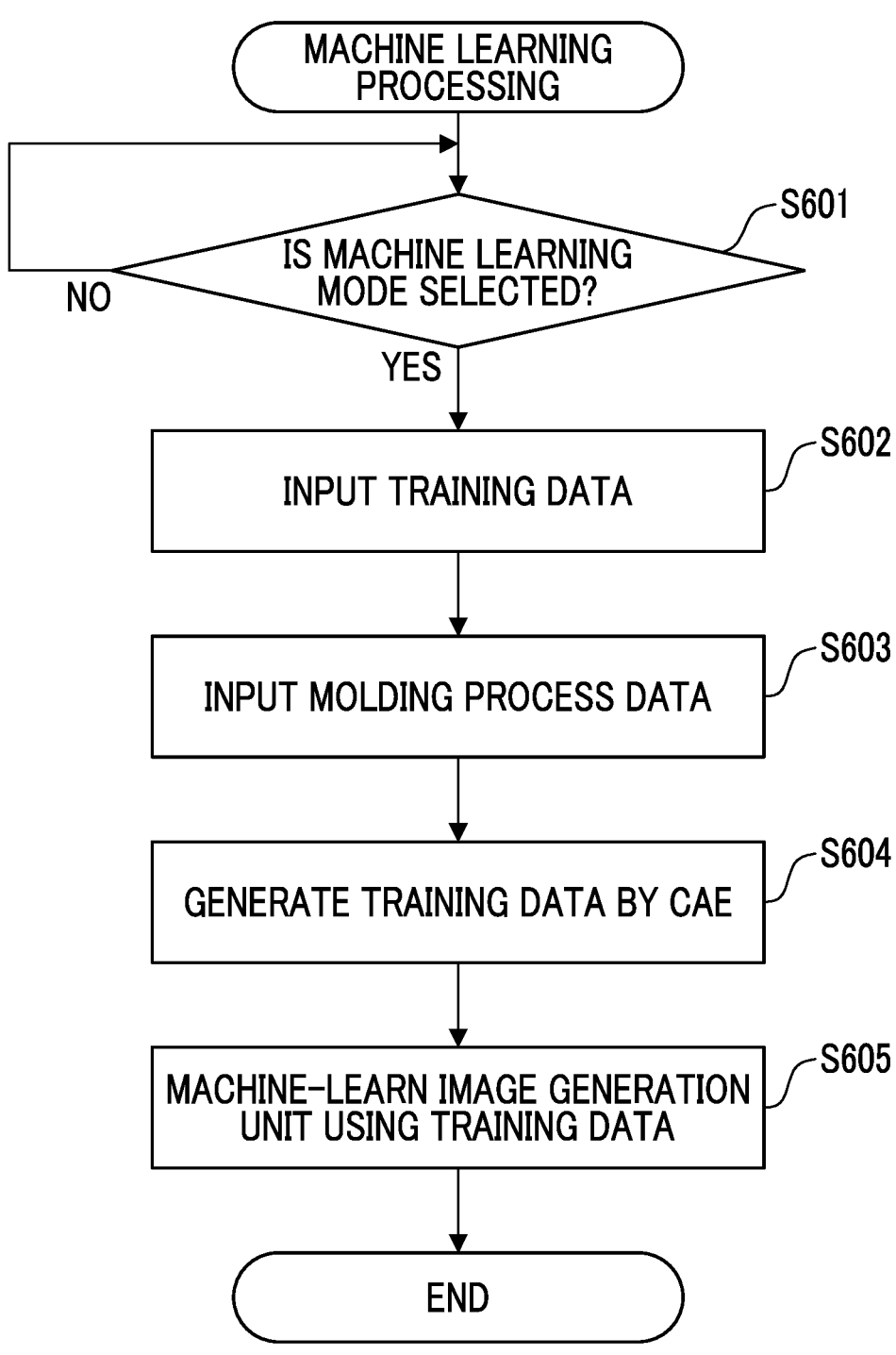
FIG. 15 is a flowchart illustrating an example of a procedure of machine learning processing executed by an inspection apparatus.
Figure 16A:
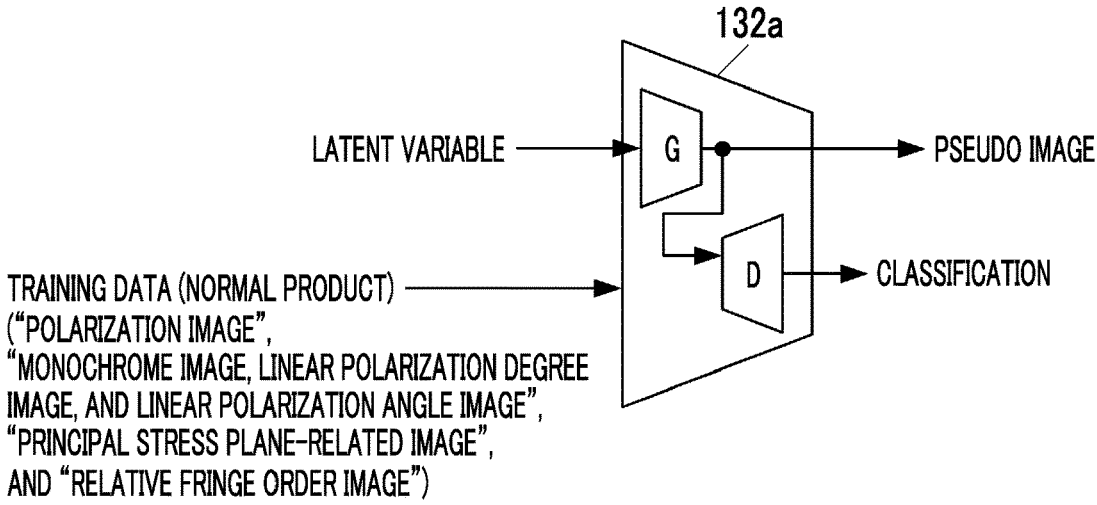
FIG. 16A is a diagram illustrating the machine learning processing of the first to fourth embodiments.
Figure 16B:
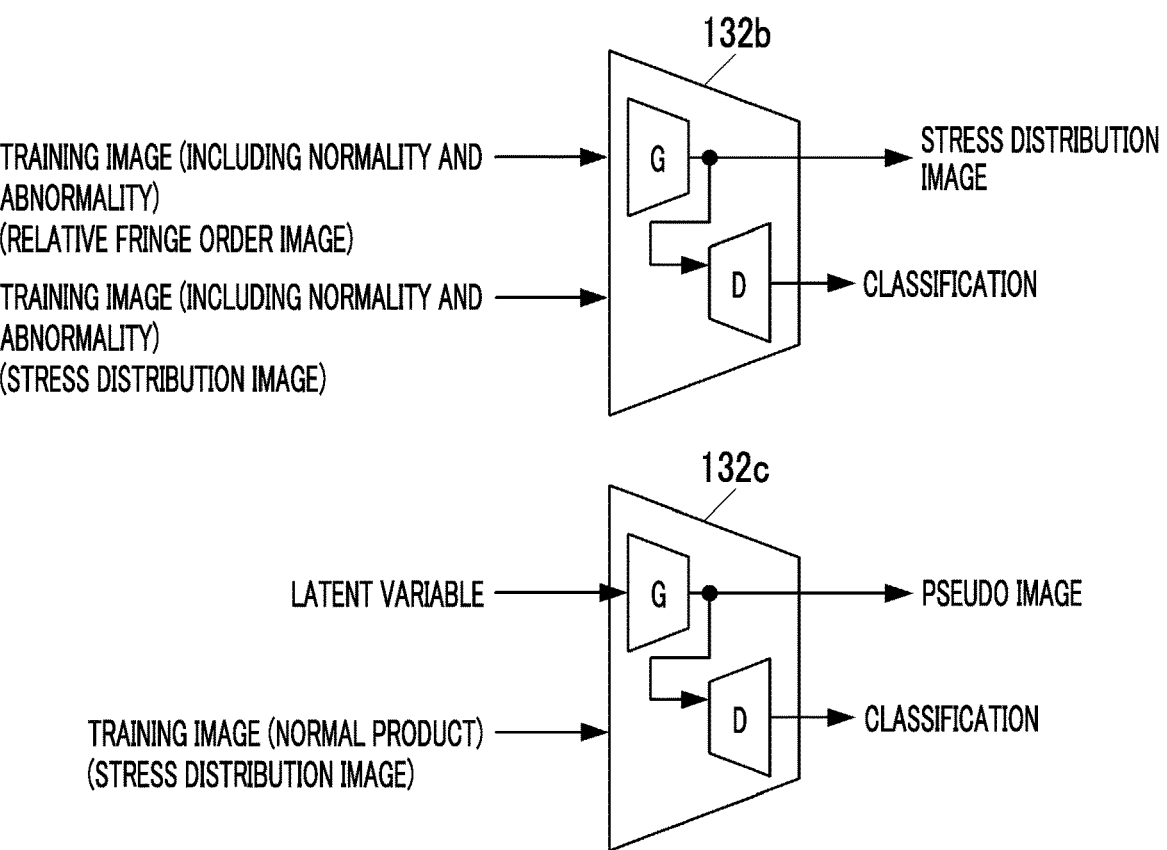
FIG. 16B is a diagram illustrating the machine learning processing of the fifth embodiment.

FIG. 15 is a flowchart illustrating an example of the procedure of machine learning processing executed by the inspection apparatus. FIG. 16A is a diagram illustrating the machine learning processing according to the first to fourth embodiments. FIG. 16B is a diagram illustrating the machine learning processing according to the fifth embodiment.

The image generating unit 132*a*, the first image generating unit 132*b*, and the second image generating unit 132*c* described above need to perform machine learning with training data given in advance.

Therefore, the inspection apparatus 100 has, as illustrated in FIG. 2, an operation unit 141 capable of selecting an operation mode (machine learning mode) for performing machine learning and a training data input unit 142 capable of inputting training data from the outside. Further, the inspection apparatus 100 may have a CAE calculation unit 143 for creating training data and a molding process data input unit 144 capable of inputting molding process data.

As illustrated in FIG. 15, an operator can proceed to machine learning processing by selecting the machine learning mode via the operation unit 141 (S601). Proceeding to machine learning processing, the operator inputs training data from the training data input unit 142 (S602).

Alternatively, the operator may input molding process data from the molding process data input unit 144 (S603). Then, the CAE calculation unit 143 may generate training data based on the molding process data (S604). Then, the determination unit 132 receives the training data and machine-learns the image generating unit 132*a* (or the first image generating unit 132*b* and the second image generating unit 132*c*) (S605).

The machine learning may be performed each time the shape, material, or both of the molding product manufactured by the injection molding machine 2 changes. A change in the shape of the molding product means mold change.

An image that is training data may be a polarization image obtained by actually imaging a sample molding product with the imaging device 110 or a calculation image obtained by calculation (including analysis) from the polarization image. The sample molding product may be a molding product having the same shape and material as the molding product 3 to be inspected.

In addition, the image that is training data may be an image (virtual calculation image representing stress distribution) of a simulated sample molding product obtained by calculation based on characteristics of the sample molding product (virtual molding product) simulatively obtained by performing computer aided engineering (CAE) calculation based on the molding process data of the injection molding machine 2. The molding process data is data capable of molding process simulation and may include at least mold cavity shape data.

Although the example of FIG. 2 illustrates a configuration in which the inspection apparatus 100 includes the CAE calculation unit 143 that performs the above CAE calculation and an image of training data is created in the inspection apparatus 100, the CAE calculation unit 143 may be configured by a computer separate from the inspection apparatus 100.

In the case of the first embodiment, polarization images including four polarization channels of a plurality of sample molding products are applied as training data. Preferably, the plurality of sample molding products are normal products and different in state within a normal range.

In the case of the second embodiment, a set of monochrome, linear polarization degree, and linear polarization angle images of a plurality of sample molding products is applied as training data. Preferably, the plurality of sample molding products are normal products and different in state within a normal range.

In the case of the third embodiment, principal stress plane-related images (such as phase contrast images and principal stress difference images) of a plurality of sample molding products are applied as training data. Preferably, the plurality of sample molding products are normal products and different in state within a normal range.

In the case of the fourth embodiment, relative fringe order images of a plurality of sample molding products are applied as training data. Preferably, the plurality of sample molding products are normal products and different in state within a normal range.

In the case of the fifth embodiment, a combination of relative fringe order and stress distribution images of each of a plurality of sample molding products is applied as the training data of the first image generating unit 132b. The first image generating unit 132b is machine-learned so as to output a stress distribution image corresponding to relative fringe order image input. Preferably, the plurality of sample molding products are different in state and include normal and abnormal products.

A stress distribution image of each of a plurality of sample molding products is applied as the training data of the second image generating unit 132c. Preferably, the plurality of sample molding products are normal products and different in state within a normal range.

By the machine learning described above, the determination unit 132 is capable of the determination processing described above.

As described above, according to the inspection apparatus 100 and the injection molding system 1 of the present embodiment, the imaging device 110 acquires a polarization image of the molding product 3 to be inspected. Further, the image generating unit 132a or the second image generating unit 132c of the determination unit 132 inputs the polarization image or a calculation image obtained by calculation from the polarization image as an input image and outputs a pseudo image with features of a normal product. Then, the determination unit 132 determines the quality of the molding product based on the input image and the pseudo image. Therefore, the determination unit 132 is capable of determining the quality with small load and high accuracy.

Further, the inspection apparatus 100 may have the training data input unit 142 for training data input, and at least a polarization image of a sample molding product that is a normal product, a calculation image obtained by calculation from the polarization image, a virtual polarization image calculated with regard to a virtual molding product calculated by simulating a process via CAE calculation based on molding process data, and a calculation image obtained by calculation from the virtual polarization image may be input as training data. Then, the image generating unit 132a (or the second image generating unit 132c) may perform machine learning using the training data. By such machine learning, the above pseudo image generation can be performed.

Further, the polarization image or virtual polarization image may include four or more polarization channels with different polarization angles. Further, the calculation image may include one or more of a combination of monochrome, linear polarization degree, and linear polarization angle images, a principal stress plane-related image, a relative fringe order image, and a stress distribution image. By using such an image, highly accurate quality determination can be performed as to the molding product of the injection molding machine 2 that transmits light.

The embodiments of the present invention have been described above. However, the present invention is not limited to the above embodiments. The details of the embodiments can be changed as appropriate without departing from the scope of the invention.

It should be understood that the invention is not limited to the above-described embodiment, but may be modified into various forms on the basis of the spirit of the invention. Additionally, the modifications are included in the scope of the invention.

What is claimed is:

1. An inspection apparatus comprising:

an imaging device configured to acquire a polarization image of a molding product, the polarization image having a plurality of channels with different phases; and a determination unit configured to determine quality of the molding product, wherein the determination unit includes an image generating unit configured to generate a pseudo image, which has a plurality of channels, from an input image in accordance with a machine-learned learning model, and the determination unit is configured to input the polarization image or a calculation image obtained by calculation from the polarization image to the image generating unit as the input image and determine the quality of the molding product by comparing the input image and the pseudo image generated by the image generating unit in the same channel.

2. The inspection apparatus according to claim 1, wherein the imaging device includes:

a light source configured to generate light, a linear polarizer configured to produce linearly polarized light from the light emitted from the light source, and a polarization camera.

3. The inspection apparatus according to claim 2, wherein the imaging device further includes a wave plate configured to convert the linearly polarized light produced by the linear polarizer into circularly polarized light.

4. The inspection apparatus according to claim 3, wherein a molding product is disposed above the wave plate.

5. The inspection apparatus according to claim 1, further comprising a training data input unit inputting training data for machine learning associated with the machine-learned learning model, wherein the training data includes at least one of a polarization image of a normal molding product, a calculation image obtained by calculation from the polarization image of the normal molding product, a virtual polarization image of a virtual molding product calculated by simulation based on molding process data capable of simulating a normal molding process, and a calculation image calculated from the virtual polarization image, and the learning model is configured to perform the machine learning using the input training data.

6. The inspection apparatus according to claim 5, wherein the polarization image or the virtual polarization image includes four or more polarization channels different in polarization angle.

7. The inspection apparatus according to claim 5, wherein the calculation image includes one or more of a combination of a monochrome image, a linear polarization degree image, a linear polarization angle image, a principal stress plane-related image, a relative fringe order image, and a stress distribution image.

8. The inspection apparatus according to claim 1, further comprising:

a computer aided engineering (CAE) calculation unit configured to create training data for machine learning associated with the machine-learned learning model; and a molding process data input unit configured to input molding process data.

9. The inspection apparatus according to claim 8, wherein the CAE calculation unit is configured to create the training data based on the molding process data.

10. The inspection apparatus according to claim 9, wherein the molding process data includes mold cavity shape data.

11. An injection molding system comprising:

an injection molding machine; and the inspection apparatus according to claim 1 configured to inspect a molding product molded by the injection molding machine.

12. An inspection method comprising:

acquiring a polarization image of a molding product with an imaging device, the polarization image having a plurality of channels with different phases;

inputting the polarization image or a calculation image obtained by calculation from the polarization image to an image generating unit as an input image and generating a pseudo image having a plurality of channels from the input image in accordance with a machine-learned learning model; and determining quality of the molding product by comparing the input image and the pseudo image generated by the image generating unit in the same channel.

\* \* \* \* \*